(12) United States Patent
Atkins et al.

(10) Patent No.: US 9,391,489 B2
(45) Date of Patent: Jul. 12, 2016

(54) MAGNETIC COUPLER HAVING MAGNETS WITH DIFFERENT MAGNETIC STRENGTHS

(75) Inventors: Andrew Farquhar Atkins, Steyning (GB); Hing Wung To, Brighton (GB); Joshua Jonathan Dalby, Hove (GB); Simon Shepherd, Leamington Spa (GB); Jonathan Davis, North Chailey (GB); Matthew George Child, Steyning (GB)

(73) Assignee: Ricardo UK Limited (GB)

( * ) Notice: Subject to any disclaimer, the term of this patent is extended or adjusted under 35 U.S.C. 154(b) by 574 days.

(21) Appl. No.: 13/988,293

(22) PCT Filed: Nov. 17, 2011

(86) PCT No.: PCT/EP2011/070410
§ 371 (c)(1),
(2), (4) Date: Oct. 4, 2013

(87) PCT Pub. No.: WO2012/066106
PCT Pub. Date: May 24, 2012

(65) Prior Publication Data
US 2014/0060241 A1 Mar. 6, 2014

(30) Foreign Application Priority Data
Nov. 17, 2010 (GB) .................................. 1019473.6

(51) Int. Cl.
*H02K 51/00* (2006.01)
*H02K 7/02* (2006.01)
(Continued)

(52) U.S. Cl.
CPC ................ *H02K 7/025* (2013.01); *F16D 27/01* (2013.01); *F16F 15/18* (2013.01); *H02K 49/102* (2013.01); *Y10T 74/2119* (2015.01)

(58) Field of Classification Search
CPC .......... H02K 51/00; F16D 27/01; F16F 15/30
USPC .............. 310/103, 104–110, 74, 156.36, 114, 310/153
See application file for complete search history.

(56) References Cited

U.S. PATENT DOCUMENTS 3,602,067 A 8/1971 Wetherbee, Jr.
3,795,231 A 3/1974 Brille
(Continued)

FOREIGN PATENT DOCUMENTS

CN 101051773 A 10/2007
CN 101127465 A 2/2008
(Continued)

OTHER PUBLICATIONS

Chinese Office Action for Application No. 201080022351.2 dated Apr. 9, 2013.
(Continued)

*Primary Examiner* — Michael Andrews
(74) *Attorney, Agent, or Firm* — Lerner, David, Littenberg, Krumholz & Mentlik, LLP

(57) ABSTRACT

A coupling apparatus (20) is provided for transferring energy to or from a flywheel. The coupling apparatus comprises first (22) and second (24) movable members, each having one or magnets (30, 34) arranged thereon, wherein the first movable member (22) is arranged to be coupled to a flywheel. The magnetic strength of a first magnet (30) arranged on the first movable member (22) exceeds the magnetic strength of a second magnet (34) arranged on the second movable member (24).

20 Claims, 14 Drawing Sheets

(51) Int. Cl.
  *F16F 15/18* (2006.01)
  *H02K 49/10* (2006.01)
  *F16D 27/01* (2006.01)

(56) References Cited

U.S. PATENT DOCUMENTS

| | | | |
|---|---|---|---|
| 3,844,260 A | 10/1974 | Scott, Jr. et al. | |
| 4,115,040 A | 9/1978 | Knorr | |
| 4,123,949 A | 11/1978 | Knight, Jr. et al. | |
| 4,183,259 A | 1/1980 | Giovachini et al. | |
| 4,208,921 A | 6/1980 | Keyes | |
| 4,233,858 A | 11/1980 | Rowlett | |
| 4,277,707 A | 7/1981 | Silver et al. | |
| 4,359,912 A | 11/1982 | Small | |
| 4,414,805 A | 11/1983 | Walker | |
| 4,588,040 A | 5/1986 | Albright, Jr. et al. | |
| 4,625,135 A | 11/1986 | Kasabian | |
| 4,629,947 A | 12/1986 | Hammerslag et al. | |
| 4,660,435 A | 4/1987 | Davis et al. | |
| 4,695,341 A | 9/1987 | Matuska et al. | |
| 4,713,965 A | 12/1987 | Kobayashi | |
| 4,767,378 A | 8/1988 | Obermann | |
| 4,896,064 A | 1/1990 | Taiani | |
| 5,165,305 A | 11/1992 | Veronesi | |
| 5,214,358 A | 5/1993 | Marshall | |
| 5,214,981 A | 6/1993 | Weinberger et al. | |
| 5,285,699 A | 2/1994 | Walls et al. | |
| 5,341,060 A | 8/1994 | Kawamura | |
| 5,466,049 A | 11/1995 | Harmsen | |
| 5,514,923 A | 5/1996 | Gossler et al. | |
| 5,568,023 A | 10/1996 | Grayer et al. | |
| 5,569,111 A | 10/1996 | Cho et al. | |
| 5,633,555 A | 5/1997 | Ackermann et al. | |
| 5,763,973 A | 6/1998 | Cramer | |
| 5,767,595 A | 6/1998 | Rosen | |
| 5,784,926 A | 7/1998 | Maass | |
| 6,148,865 A * | 11/2000 | Head | B29C 70/222 138/123 |
| 6,211,597 B1 | 4/2001 | Nakano | |
| 6,217,298 B1 | 4/2001 | Klaui | |
| 6,347,925 B1 | 2/2002 | Woodard et al. | |
| 6,440,055 B1 | 8/2002 | Meisberger | |
| 6,441,581 B1 | 8/2002 | King et al. | |
| 6,585,490 B1 | 7/2003 | Gabrys et al. | |
| 6,604,360 B1 | 8/2003 | Vuk | |
| 6,774,591 B2 | 8/2004 | Arimitsu et al. | |
| 7,066,050 B1 | 6/2006 | Gabrys et al. | |
| 7,263,912 B1 | 9/2007 | Gabrys et al. | |
| 7,416,039 B1 | 8/2008 | Anderson et al. | |
| 7,508,104 B2 | 3/2009 | Schmidt et al. | |
| 7,740,092 B2 | 6/2010 | Bender | |
| 8,183,722 B2 | 5/2012 | Akutsu et al. | |
| 8,398,515 B2 | 3/2013 | Sartre et al. | |
| 8,482,171 B2 | 7/2013 | Edwards | |
| 2002/0006523 A1 | 1/2002 | Obeshaw | |
| 2002/0174798 A1 | 11/2002 | Kumar | |
| 2003/0098158 A1 | 5/2003 | George et al. | |
| 2003/0098185 A1 | 5/2003 | Komeda et al. | |
| 2004/0051507 A1 | 3/2004 | Gabrys et al. | |
| 2004/0231629 A1 * | 11/2004 | Linnig | F16F 15/1207 123/192.1 |
| 2005/0028628 A1 | 2/2005 | Liue | |
| 2005/0040776 A1 | 2/2005 | Sibley | |
| 2005/0150323 A1 | 7/2005 | Spears | |
| 2005/0161304 A1 | 7/2005 | Brandl et al. | |
| 2006/0175923 A1 * | 8/2006 | Abou Akar | H02K 1/278 310/114 |
| 2006/0290218 A1 * | 12/2006 | Shafer | H02K 1/278 310/104 |
| 2007/0101714 A1 | 5/2007 | Duesmann et al. | |
| 2007/0241629 A1 | 10/2007 | Ionel et al. | |
| 2008/0169720 A1 | 7/2008 | Petek | |
| 2008/0176662 A1 | 7/2008 | Tateno et al. | |
| 2008/0207336 A1 | 8/2008 | Yokoyama | |
| 2009/0072647 A1 * | 3/2009 | Hino | H02K 1/276 310/156.15 |
| 2009/0167101 A1 | 7/2009 | Saga et al. | |
| 2010/0090552 A1 | 4/2010 | Bright | |
| 2010/0156220 A1 * | 6/2010 | Ekberg | H02K 1/278 310/103 |
| 2010/0176674 A1 * | 7/2010 | Post | H02K 49/102 310/103 |
| 2010/0231075 A1 | 9/2010 | Han et al. | |
| 2010/0237629 A1 | 9/2010 | Gray | |
| 2010/0259121 A1 | 10/2010 | Ueda et al. | |
| 2011/0012458 A1 | 1/2011 | Atallah et al. | |
| 2011/0031827 A1 | 2/2011 | Gennesseaux | |
| 2011/0057456 A1 | 3/2011 | Atallah et al. | |
| 2011/0121672 A1 * | 5/2011 | Calverley | H02K 1/08 310/103 |
| 2012/0060643 A1 | 3/2012 | Wiklof | |
| 2012/0060644 A1 | 3/2012 | Morgan et al. | |
| 2012/0097570 A1 | 4/2012 | Pinneo et al. | |
| 2012/0190461 A1 | 7/2012 | Atkins | |
| 2014/0210424 A1 | 7/2014 | Schroeder | |

FOREIGN PATENT DOCUMENTS

| | | |
|---|---|---|
| DE | 955 524 C | 1/1957 |
| DE | 955524 C | 1/1957 |
| DE | 2119015 A1 | 10/1972 |
| DE | 2535790 A1 | 3/1976 |
| DE | 2622295 A1 | 12/1977 |
| DE | 26 34 918 A1 | 2/1978 |
| DE | 2634918 A1 | 2/1978 |
| DE | 2949125 A1 | 6/1981 |
| DE | 3143845 A1 | 5/1983 |
| DE | 3137197 A1 | 11/1983 |
| DE | 3535394 A1 | 6/1986 |
| DE | 19718480 A1 | 11/1997 |
| DE | 202004011085 U1 | 9/2004 |
| DE | 10321387 A1 | 12/2004 |
| DE | 102008023789 A1 | 11/2009 |
| EP | 0066040 A1 | 12/1982 |
| EP | 161326 A1 | 11/1985 |
| EP | 0212552 A2 | 3/1987 |
| EP | 797863 A1 | 10/1997 |
| EP | 1102385 A2 | 5/2001 |
| EP | 1353436 A2 | 10/2003 |
| EP | 1447901 A2 | 8/2004 |
| EP | 1906054 A1 | 4/2008 |
| EP | 2133981 A2 | 12/2009 |
| EP | 2180583 A1 | 4/2010 |
| FR | 2574499 A1 | 6/1986 |
| FR | 2756118 A1 | 5/1998 |
| FR | 2766027 A1 | 1/1999 |
| GB | 745911 A | 3/1956 |
| GB | 1340362 A | 12/1973 |
| GB | 1385423 A | 2/1975 |
| GB | 1433748 A | 4/1976 |
| GB | 1443530 A | 7/1976 |
| GB | 1516862 A | 7/1978 |
| GB | 2062112 A | 5/1981 |
| GB | 2078016 A | 12/1981 |
| GB | 2237339 A | 5/1991 |
| GB | 2297870 A | 8/1996 |
| GB | 2400410 A | 10/2004 |
| GB | 2437568 A | 10/2007 |
| GB | 2448598 A | 10/2008 |
| GB | 2457682 A | 8/2009 |
| GB | 2462489 A | 2/2010 |
| JP | 48053200 | 7/1973 |
| JP | 55-082836 | 6/1980 |
| JP | 57-097940 | 6/1982 |
| JP | 57-200746 | 12/1982 |
| JP | 58-217843 | 12/1982 |
| JP | 58-217842 | 12/1983 |
| JP | 59153459 | 9/1984 |
| JP | 60125456 | 7/1985 |
| JP | 61-099738 | 5/1986 |
| JP | 61-140638 | 6/1986 |
| JP | 61173662 A | 8/1986 |
| JP | 61-281933 | 12/1986 |

(56) References Cited

FOREIGN PATENT DOCUMENTS

| | | |
|---|---|---|
| JP | 04-128622 A | 4/1992 |
| JP | 04362226 A | 12/1992 |
| JP | 5-168222 A | 7/1993 |
| JP | 06261421 | 9/1994 |
| JP | 07264838 | 10/1995 |
| JP | 09-074777 A | 3/1997 |
| JP | 09-317827 | 12/1997 |
| JP | H10306831 A | 11/1998 |
| JP | 2001041257 A | 2/2001 |
| JP | 2001268706 A | 9/2001 |
| JP | 2001-286007 A | 10/2001 |
| JP | 2003165361 A | 6/2003 |
| JP | 2004211754 A | 7/2004 |
| JP | 2005-295711 A | 10/2005 |
| JP | 2005315370 A | 11/2005 |
| JP | 05168222 B2 | 3/2013 |
| NL | 8501670 A | 1/1987 |
| SU | 582429 A1 | 11/1977 |
| SU | 664074 A1 | 5/1979 |
| SU | 1420268 A1 | 8/1988 |
| WO | 9619035 A1 | 6/1996 |
| WO | 9715110 A1 | 4/1997 |
| WO | 00/74203 A1 | 12/2000 |
| WO | 0147091 A1 | 6/2001 |
| WO | 2005064777 A1 | 7/2005 |
| WO | 2006/121761 A2 | 11/2006 |
| WO | 2007029905 A2 | 3/2007 |
| WO | 2007107691 A1 | 9/2007 |
| WO | 2007135360 A1 | 11/2007 |
| WO | 2007/138353 A2 | 12/2007 |
| WO | 2007144556 A1 | 12/2007 |
| WO | 2008076694 A2 | 6/2008 |
| WO | 2009/010819 A1 | 1/2009 |
| WO | 2009071922 A2 | 6/2009 |
| WO | 2009/087408 A2 | 7/2009 |
| WO | 2009087409 A1 | 7/2009 |
| WO | 2009/148918 A2 | 12/2009 |
| WO | 2010094912 A1 | 8/2010 |
| WO | 2010/109208 A1 | 9/2010 |
| WO | 2010109209 A1 | 9/2010 |
| WO | 2010109210 A1 | 9/2010 |
| WO | 2011048133 A1 | 4/2011 |
| WO | 2011048141 A1 | 4/2011 |
| WO | 2011061496 A2 | 5/2011 |

OTHER PUBLICATIONS

Extended European Search Report for Application No. 13174994.7 dated Sep. 9, 2013.
Japanese Office Action for Application No. 2012-501384 dated Dec. 24, 2013.
British Search and Examination Report for Application No. GB1310874.1 dated Jul. 21, 2013.
British Search and Examination Report for Application No. GB1310875.8 dated Jul. 21, 2013.
British Search and Examination Report for Application No. GB1310876.6 dated Jul. 21, 2013.
Chinese Office Action for Application No. 201080022344.2 dated Mar. 4, 2013.
GB Search Report issued in corresponding application No. GB0918384.9, dated Jan. 29, 2010,4 pages.
International Search Report and Written Opinion for Application No. PCT/GB2012/000373 dated Aug. 7, 2012.
International Search Report from PCT/GB2008/004050 dated May 27, 2009 (7 pages).
International Search Report from PCT/GB20101/000590 dated Aug. 3, 2010 (3 pages).
International Search Report from PCT/GB2010/000591 dated Aug. 3, 2010 (3 pages).
International Search Report from PCT/GB2010/000592 dated Aug. 3, 2010 (3 pages).
International Search Report from PCT/GB2010/002124 dated Apr. 17, 2012 (3 pages).
International Search Report issued in PCT/EP2010/065781, mailed Dec. 28, 2010,7 pages.
International Search Report issued in PCT/EP2010/065791, mailed Mar. 23, 2011,8 pages.
Search Report issued in corresponding application GB0918386.4. dated Jan. 27, 2010.4 pages.
Written Opinion from PCT/GB2008/004050 dated May 27, 2009 (10 pages).
Written Opinion from PCT/GB2010/000590 dated Aug. 3, 2010 (6 pages).
Written Opinion from PCT/GB2010/000591 dated Aug. 3, 2010 (6 pages).
Written Opinion from PCT/GB2010/000592 dated Aug. 3, 2010 (8 pages).
Written Opinion from PCT/GB2010/002124 (8 pages).
Written Opinion issued in PCT/EP2010/065781, mailed Dec. 28, 2010,7 pages.
Written Opinion issued in PCT/EP2010/065791, mailed Mar. 23, 2011, 10 pages.
International Search Report issued in PCT/EP2011/070410 mailed on Mar. 13, 2012 (2 pages).
Written Opinion of the International Searching Authority issued in PCT/EP2011/070410 mailed on Mar. 13, 2012 (6 pages).
Patent Abstracts of Japan for Publication No. 09074777, Publication Date: Mar. 18, 1997 (1 Page).
GB Search Report from Application No. GB1019473.6 dated Jun. 17, 2011 (3 pages).

* cited by examiner

MAGNETIC COUPLER HAVING MAGNETS WITH DIFFERENT MAGNETIC STRENGTHS

The invention relates to an improved coupler for coupling forces between members, in particular for enabling transfer of energy to and from a rotating flywheel, and a method for constructing such an improved coupler.

BACKGROUND

Existing flywheels for energy storage are sometimes constructed such that the rotating mass of the flywheel rotates inside a chamber containing a vacuum. Operating the rotating mass inside a vacuum is advantageous since it reduces energy losses due to air resistance also known as windage. However, in order to transfer energy into and out of the rotating flywheel mass, a coupling means is required. Some existing flywheels use a rotating shaft passing through a rotating seal in the vacuum chamber to couple torque from an energy source to the flywheel energy storage means. Rotating seals are never perfect, however, since they inevitably leak and therefore require an environmental management system to be coupled to the vacuum chamber in order to maintain the vacuum despite leakage. Furthermore, the seals become more "leaky" with age and as rotational speed increases, and also wear more quickly at higher speeds. The mass, volume and cost of such an environmental management system is undesirable. The use of rotating seals is therefore undesirable.

Magnetic couplings can be used with flywheels to transfer torque through a vacuum chamber wall, thereby obviating the need for rotating seals. For example, a magnetic gear used to couple force between movable members, for example drive shafts, is described in International Patent Application PCT/GB2010/000590, filed by Ricardo UK Limited, the entire contents of which are incorporated herein by reference. A rotational magnetic gear 100 as described in PCT/GB2010/000590 is shown in FIG. 1a herein. The device has first and second movable members 110, 120, each having a circumferentially distributed array of alternating magnetic poles 115, 116, 125, 126. Magnetic flux is coupled between the pole arrays by coupling elements 130. The coupling elements 130 minimise the air gap 150 between the moveable members, especially when a membrane 140 is present in the air gap. FIG. 1b shows the lines of magnetic flux 160, 170 in a portion of the arrangement of FIG. 1a. The membrane 140 allows the two movable members 110, 120 to be operated in different respective atmospheric conditions. For example, one member may be operated in a vacuum. As one member rotates in a clockwise direction, the other member counter rotates in an anticlockwise direction as the lines of magnetic flux 170 pass from one array of poles to the other array of poles through the coupling elements 130. No physical connection is required therefore the use of rotating seals can be eliminated which is advantageous in that it allows expensive environmental management systems to also be eliminated. The membrane 140 of course needs to be strong enough structurally to withstand the forces exerted by air pressure.

Although not limited to flywheel applications, the arrangement shown in FIG. 1a can be advantageously used to couple a high speed flywheel operating inside a vacuum enclosure to a lower speed drive shaft under atmospheric pressure since, if the number of poles of the first member is dissimilar to the number of poles on the second member, a gearing effect results which allows the driveshaft in atmospheric pressure to operate at a lower speed than the flywheel, thereby reducing windage losses. However, in order to achieve a high gearing ratio, the dimensions of the magnetic poles on one of the members must be made as small as possible in order to fit as many as possible in. This, coupled with the need to make the whole assembly as compact as possible, dictates that the coupling elements 130 should also be relatively small. Further, in order to maximise the transfer of flux and thereby maximise the torque capacity of the magnetic gear coupling, the device may be extended along its axial length so that it is generally elongate cylindrical. This can mean that the coupling elements 130 have a relatively long length dimension and a relatively narrow cross sectional area. The coupling elements are therefore prone to suffering from a lack of rigidity and can bend, move, or vibrate. This can lead to non-optimal functioning of the device and/or eventual degradation and/or failure. It is also difficult to manufacture such a device since careful alignment is necessary and many production steps are needed to individually assemble the coupling elements into the correct position and hold them there.

The angular offset between the input and output shafts of a magnetic gear such as the one shown in FIG. 1a varies according to the torque applied and to the torque coupling capacity of the magnetic gear at a given meshing position. Such variation of the torque coupling capacity with meshing position will result in a torsional vibration in the shafts. This can reduce the life of the associated mechanical components, and/or can result in failure and/or disengagement. This is an especially serious problem if the rotational speed is such that the frequency of the torsional vibration coincides with a resonance of the mechanical system. Therefore it would be advantageous if the variation in torque coupling capacity of a magnetic gear could be reduced or eliminated. This would allow smaller, cheaper, magnet arrays to be used, since the minimum torque coupling capability would then be much closer to the mean torque coupling capability. Torsional vibration of the shafts would also be reduced, allowing cheaper, lighter and smaller components to be used. A flywheel energy storage system employing such smaller, cheaper and lighter components would have a higher energy storage density.

Existing magnetic couplings suffer from further disadvantages. For example, in existing systems where magnetic coupling is used to transfer energy into and out of a rotating flywheel situated in a vacuum to and from means outside that vacuum, a cooling arrangement is required in the vacuum. Such a cooling arrangement acts to reduce heat caused by operation of the flywheel and magnetic coupling, including heat generated due to variation in the magnetic field of the magnets on the flywheel side of the coupling. Such cooling arrangements can be complex, adding to the overall complexity, bulk and expense of the system. Existing magnetic coupling arrangements also suffer from general fatigue over time, and in particular there is a tendency for the rotating magnets to shift out of place over time due to the effects of rotation. Similarly, any stationary electromagnetic poles provided between the two respective rotating magnetic members can encounter slip and fatigue over time.

There is no known coupler using rotatable magnets which can be used to transfer energy into an out of a flywheel situated in a vacuum in an efficient, cost effective and compact manner.

An invention is set out in the claims.

According to an aspect, a coupling apparatus for transferring energy to or from a flywheel is provided. The coupling apparatus comprises first and second movable members, each having one or magnets arranged thereon, wherein the first movable member is arranged to be coupled to a flywheel and wherein the magnetic strength of a first magnet arranged on the first movable member exceeds the magnetic strength of a second magnet arranged on the second movable member. The first magnet may be larger than the second magnet. The first magnet may be a sintered magnet and/or the second magnet may be a bonded magnet. As a result, the magnetic field across the coupling apparatus is skewed so that losses due to variation in magnetic field occur mainly in the vicinity of the second moveable member, away from the flywheel.

According to another aspect, a coupling apparatus for transferring energy to or from a flywheel is provided. The coupling apparatus comprises first and second movable members, each having one or magnets arranged thereon, wherein the first movable member is arranged to be coupled to a flywheel. The coupling apparatus further comprises a retainer for physically retaining the one or more magnets arranged on the first movable member. The retainer may take the form of a winding which can be wound around an outer surface of the magnets on the first movable member. Alternatively it may take the form of a sleeve which can be fitted over an outer surface of the magnets on the first movable member. The retainer may be formed from a retaining material and an adhesive material, wherein the adhesive material may include fragments of other materials embedded therein for the provision of electronic stress relief.

According to another aspect, a coupling apparatus for transferring energy to or from a flywheel is provided. The coupling apparatus comprises first and second movable members, each having one or magnets arranged thereon, wherein the first movable member is arranged to be coupled to a flywheel. The coupling apparatus further comprises a membrane intermediate the first and second movable members, said membrane comprising a groove or recess for locating one or more magnetic poles. The membrane may be formed from Polyether ether ketone (PEEK).

According to another aspect, a coupling apparatus for transferring energy to or from a flywheel is provided. The coupling apparatus comprises first and second movable members, each having one or magnets arranged thereon, wherein the first movable member is arranged to be coupled to a flywheel. The coupling apparatus further comprises a liner intermediate the second movable member and the one or more magnets arranged thereon. The liner may comprise one or more discontinuous sections and/or may be formed from a suitable material such as Somaloy.

According to another aspect, a coupling apparatus for transferring energy to or from a flywheel is provided. The coupling apparatus comprises first and second movable members, each having one or magnets arranged thereon, wherein the first movable member is arranged to be coupled to a flywheel. The first and second movable members are rotatable about a common rotation axis, with the second movable member being provided radially outward of the first movable member. The second movable member is formed from a material with low electrical conductivity and low permeability. For example it is formed of Peek or Glass fibre. The second movable member may comprise first and second sections formed from first and second respective materials.

According to another aspect, a coupling apparatus for transferring energy to or from a flywheel is provided. The coupling apparatus comprises first and second movable members, each having one or magnets arranged thereon, wherein the first movable member is arranged to be coupled to a flywheel. The apparatus is provided inside a housing or casing, which can also house the flywheel to which the first movable member is coupled. A formation on an inner surface of the casing is arranged to provide magnetic flux shielding during operation of the coupling apparatus.

According to another aspect, a coupling apparatus for transferring energy to or from a flywheel is provided. The coupling apparatus comprises first and second movable members, each having one or magnets arranged thereon, wherein the first movable member is arranged to be coupled to a flywheel. The first and second movable members are rotatable about a common rotation axis, with the second movable member being provided radially outward of the first movable member and connected to a shaft at a first end. An end plate is provided at a second end of the second movable member, substantially axially opposite the shaft.

According to another aspect, a coupling apparatus for transferring energy to or from a flywheel is provided. The coupling apparatus comprises first and second movable members, each having one or magnets arranged thereon, wherein the first movable member is arranged to be coupled to a flywheel. The apparatus further comprises a stator, between the first and second movable members. Means is provided on the stator, and/or on at least one of the movable members, for enhancing air flow around the apparatus. The means may comprise a scrolling or groove. The means may comprise a projection such as a fin or a blade. A plurality of such projections may be provided. The means may comprise an opening or channel through the stator and/or through the second movable member.

According to another aspect, a method for constructing any coupling apparatus as described herein is provided.

FIGURES

Embodiments will now be described with respect to the appended figures of which:

FIG. 1b is a close-up cross-sectional view of the magnetic gear coupling of FIG. 1a;

FIG. 2b is a close-up view of the circled section in FIG. 2a;

FIG. 4b is a close-up view of the circled section in FIG. 4a;

FIG. 7b shows a cross-section through a portion of the low speed side shown in FIG. 7a.

FIG. 12b shows radially angled holes in the outer rotor of FIG. 12a;

OVERVIEW

In overview, an improved coupling apparatus is provided for use with a rotating flywheel. The improved coupling apparatus comprises a high speed section, to be coupled to the flywheel, and a low speed section magnetically coupled to the high speed section. The improved coupling apparatus is used to transfer torque between the high and low speed sections. Hence, when it is coupled to a flywheel, energy from the flywheel can be transmitted to other components via the improved coupling apparatus in an efficient and compact manner. The flywheel can be housed in a vacuum or low pressure chamber along with the high speed section of the coupling whilst the low speed section of the coupling can be provided outside the vacuum or low pressure chamber. Hence the two sections of the improved coupling apparatus can be physically separate from one another whilst still being in communication with one another. A complete physical barrier can therefore be provided between the flywheel in the vacuum and an external component to which energy is to be transmitted from the flywheel, or vice versa, via the improved coupling apparatus.

As described in more detail below, particular physical configurations and material selections have been identified to enhance operation of the improved coupling apparatus. Some or all of these improvements may be used in isolation or in combination either to enhance an existing flywheel arrangement or to construct a new flywheel arrangement with associated coupling apparatus.

DETAILED DESCRIPTION

Figure 1A:
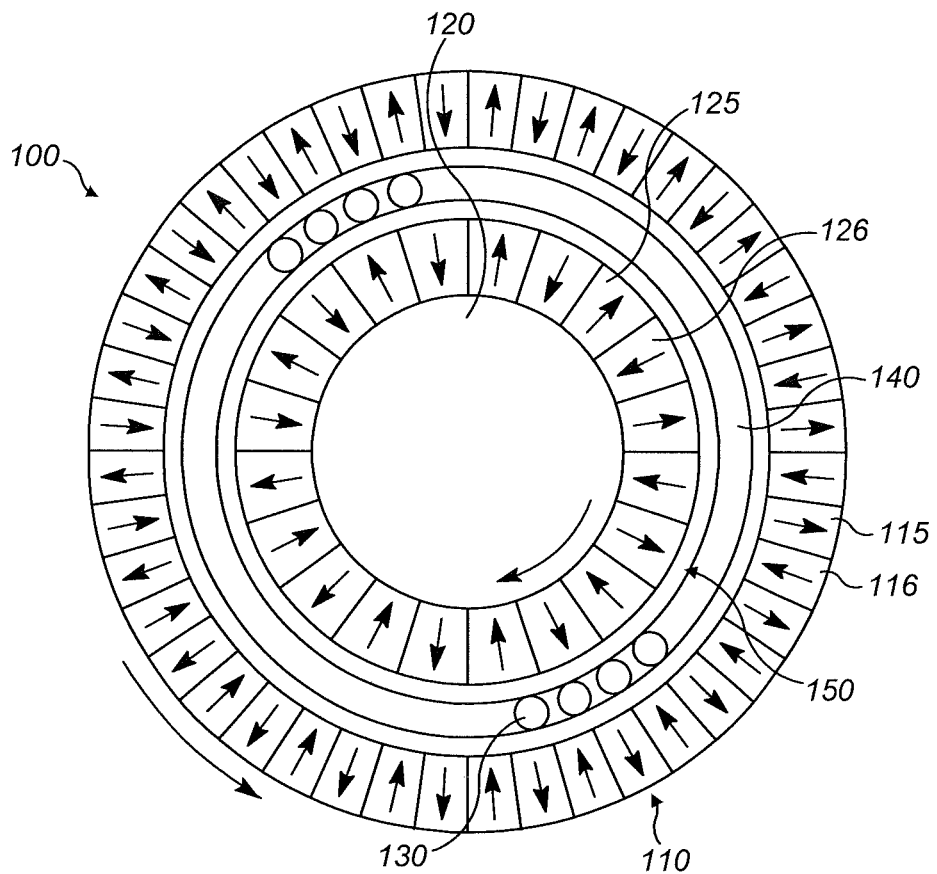
FIG. 1a is a cross sectional view of a known magnetic gear coupling.

Generally, a known magnetic gear is constructed and operates as follows: Referring to FIG. 1a, a coupling element 130 is placed between the first and second movable members 110, 120. The magnetic coupling element 130 has a high relative magnetic permeability, in excess of 400, and therefore in operation magnetic flux passes easily through it, from the poles 115, 116 of the first member 120 to the poles 125, 126 of the second member 110 and vice versa. The coupling element is effectively "transparent" to the magnetic field. The coupling element 130 should be of a material having a high magnetic permeability, for example soft iron. The coupling element 130 should ideally have as high as possible electrical resistance, so as to reduce induced eddy currents and the losses due to resistive heating associated therewith. Sufficient coupling members are present in FIG. 1a so as to span at least two north-south pole pairs of whichever member 110, 120 that has the widest spaced apart poles 115, 116, 125, 126.

The space between adjacent coupling elements should have a much lower magnetic permeability than the coupling elements 130 themselves. One suitable material for such spaces is plastic. When arranged thus, in use, magnetic flux is coupled via each coupling element 130 from the poles of each member 110, 120 of FIG. 1a and thereby torque is coupled between the first and second members 110, 120. In use, the first and second members of FIG. 1a 110, 120 contra-rotate.

The magnetic poles 115, 116, 125, 126 as shown in FIG. 1a may be rare earth magnets, since these exhibit high field densities for a given volume of magnetic material. The magnets are smaller lighter, more compact, and able to transmit greater torque than other available types of permanent magnet. Rare earth magnets have also been found to be good at withstanding compressive forces and are therefore suitable for placing on the inner circumference of a flywheel which rotates at high speed.

Referring still to FIG. 1a, it can be seen that the magnetic gear therein comprises a concentric arrangement, with the first member 120 being located concentrically inside the second member 110 and the vacuum housing being located concentrically therebetween. Incorporated in the vacuum housing 140 are the coupling elements 130. In this concentric arrangement, the first and second members 110, 120 contra-rotate.

The minimum number of coupling elements 130 required in the arrangement of FIG. 1a is that which will span two pairs of north/south pole pairs of whichever of the first and second members 110, 120 have the greater pole spacing. This minimum number guarantees that torque can be transferred between the members 110, 120 and that the relative directions of rotation of the first and second member are well defined. The coupling elements 130 can be distributed evenly around a circumference or can be confined to particular regions around the circumference of the vacuum housing 140 only. Such a concentric magnetic geared coupling can be constructed using standard machining techniques.

Figure 1B:
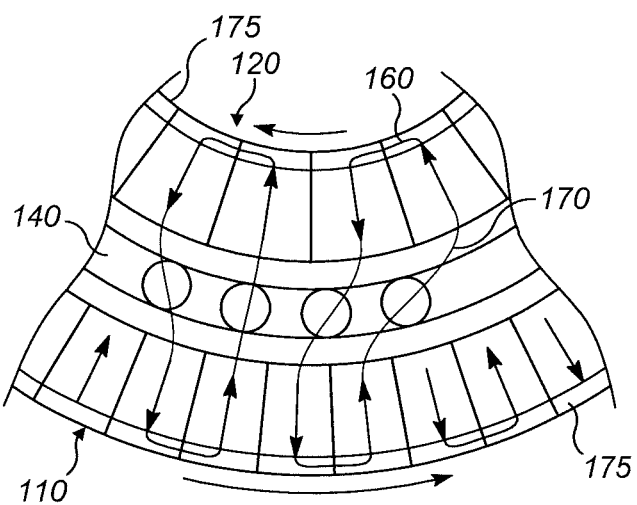

The first and second members 110, 120 in FIG. 1a can have the same number of north/south pole pairs, or can have a different number of north/south pairs. In the shown embodiment, the second member 110 has a lower number of north/south pole pairs than the first member 120. In operation, when the first member 120, having a number of north/south pole pairs m, is rotated in a anticlockwise direction, the second member 110, having a number of north/south pole pairs n, rotates in a clockwise direction. The second member 110 rotates at a speed relative to the rotational speed of the first member 120 multiplied by a factor: n divided by m. FIG. 1b shows the lines of magnetic flux 170 which pass between the poles of the first and second members 110, 120, via the coupling elements 130 which are embedded in the vacuum chamber 140 wall.

Figure 1C:
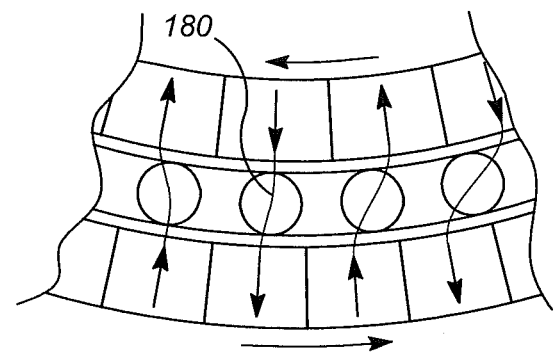
FIG. 1c to 1e show a sequence of rotational alignments of the magnetic gear coupling of FIGS. 1a and 1b.
Figure 1D:
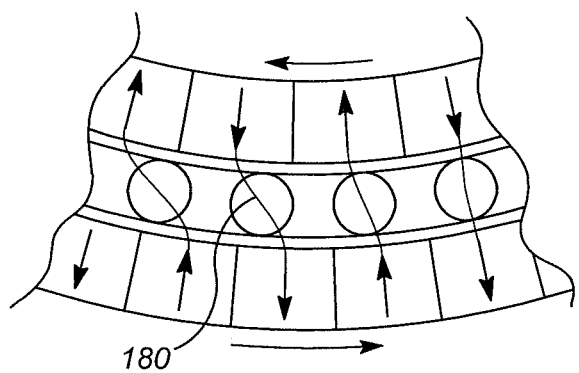
Figure 1E:
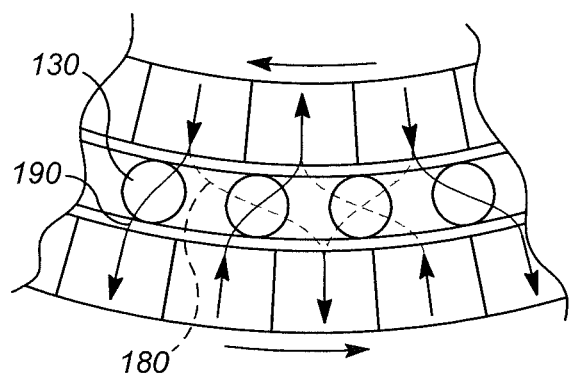

FIGS. 1c to 1e show a sequence of a rotation of the first and second members 110, 120 through three positions. FIG. 1c shows the lines of flux between the poles of the first and second members 110, 120 in a first position. FIG. 1d shows the top member having rotated slightly in a clockwise direction, and the bottom member having rotated slightly in an anti clockwise direction. The lines of flux 170 have accordingly moved position, and in particular a line of flux 180 has stretched. FIG. 1e shows a further rotation of the top member in a clockwise direction and of the lower member in an anti clockwise direction. The line of flux 180 has now stretched so far that an alternate linkage via the left most coupling element 130 has become preferable. The flux path thus switches to the new left path 190. The torque transferred from the first member to the second member is equal to the rate of change of flux as the lines of flux switch from one route to another route in this way.

Figure 2A:
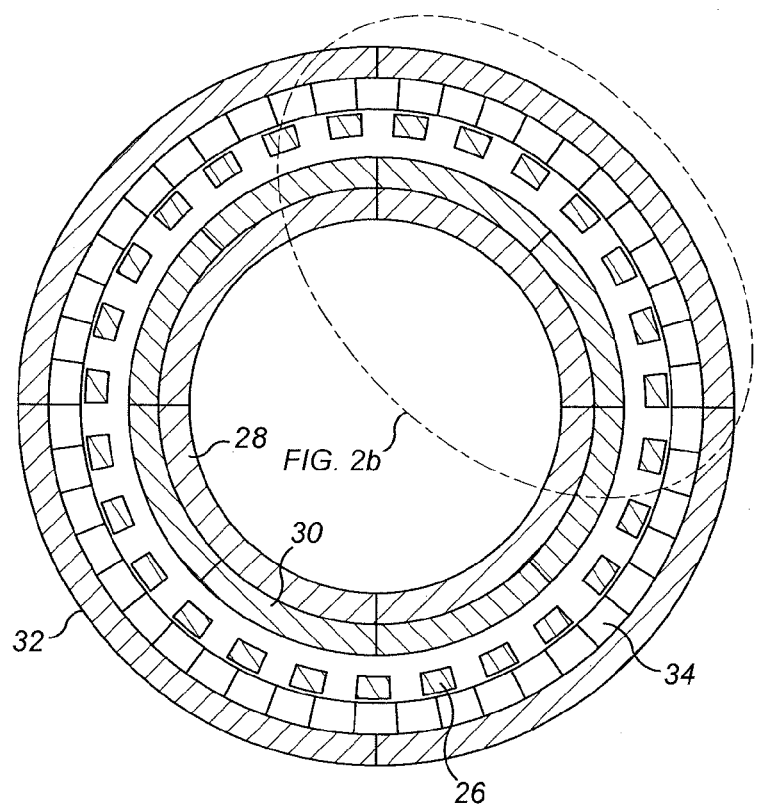
FIG. 2a is a cross-sectional view through an improved magnetic coupling.
Figure 2B:
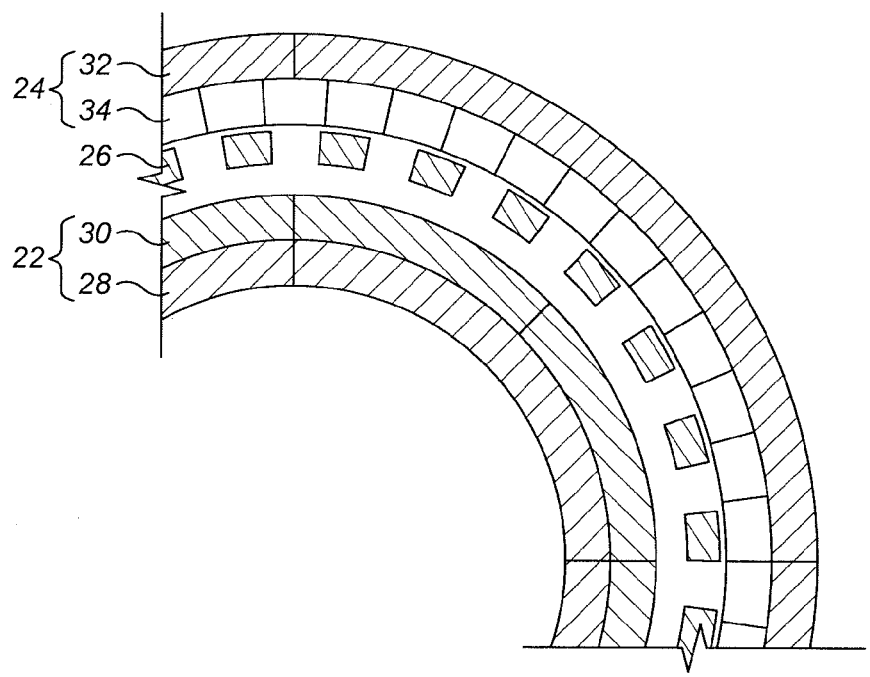

FIGS. 2a and 2b show an improved magnetic coupling which is suitable for enabling the transfer of energy to and from a rotating flywheel which is housed in a low pressure housing or vacuum. The improved magnetic coupling can comprise features as described above in relation to the known coupling shown in FIG. 1a and/or any of the alternative or additional features described herebelow. The improved magnetic coupling is described as operating with the high speed side in a vacuum however it is possible for either side of the coupling to operate at a range of air pressures or in a vacuum.

The improved magnetic coupling 20 comprises a high speed rotational section 22 to be housed in a low pressure area or vacuum and further comprises a low speed rotational section 24 to be housed outside the low pressure/vacuum area. The magnetic coupling 20 transfers torque through a chamber wall (not shown) situated between the high and low speed rotational sections 22, 24. The chamber wall can be stationary, Because a magnetic coupling 20 can transfer torque between the high and low speed rotational sections without any direct physical contact therebetween, the chamber wall which houses the flywheel and the high rotational speed section 24 of the coupling 20 can have a single continuous surface. There is no need for any gaps or breaks therein, nor is there any need for an additional physical coupling such as a rotating seal. This is advantageous as rotating seals often leak and therefore result in a need for an additional, energy consuming system for maintaining low pressure within the chamber housing the flywheel. For example certain existing flywheel couplings require a pump in the low pressure or vacuum chamber, wherein that pump takes energy from the flywheel and/or requires its own power source. Because such a pump is not required according to the arrangement shown in FIGS. 2a and 2b, the overall power requirement is lower and thus the system is more effective. Also, operating the high speed rotational section 22 (and flywheel to which it couples) in a low pressure area reduces energy losses due to winding.

There are a number of pole pieces 26 built into the chamber wall (not shown) in FIGS. 2a and 2b to enable and enhance the torque transfer across the boundary which is created by the chamber wall. The magnetic coupling 20 shown in FIGS. 2a and 2b has a fixed gear ratio based on the respective number of magnets situated in the high 22 and low 24 speed rotational sections and on the number of poles 26 in the chamber wall. According to one embodiment, the magnetic coupling has a gear ratio of 1 to 5.75, although any desired gear ratio may be achieved using the magnetic coupling shown in FIGS. 2a and 2b, within the physical restraints of the overall system in practice.

Both the high speed rotational section 22 and the low speed rotational section 24 include an array of permanent magnets. In detail, the high speed rotational section 22 comprises a high speed hub 28 and a high speed magnet array 30. The low speed rotational section 24 comprises a low speed hub 32 and a low speed magnetic array 34. The magnets of each magnetic array can be situated directly on the respective hub or may be separated therefrom by an air gap or by another component such as a liner, as described further below. As mentioned above, the magnetic arrays are separated from one another by stationary ferromagnetic pole pieces 26 situated in the boundary between the two sections 22, 24. Although not shown in FIGS. 2a and 2b, a backing liner between the low speed hub and the low speed magnetic array 34 and/or an outer sleeve provided radially outward of the high speed magnetic array 30 should ideally also be provided in the magnetic coupling 20.

In order to further improve operation of the magnetic coupling 20, particular combinations of magnets may be used. According to an embodiment, the high speed magnetic array 30 in the high speed rotational section 22 comprises one or more magnets which are larger than one or more of the magnets in the low speed magnet array 34 on the low speed rotational section 24 of the magnetic coupling. By using larger magnets in the high speed magnet array 30 as compared to the low speed magnet array 34, the desired gear ratio from the high speed to the low speed side of the magnetic coupling can be more easily achieved. A further benefit of such an arrangement is that the larger magnets on the high speed side will be dominant over the smaller magnets on the low speed side of the coupling 20, and therefore there will be a relatively small variation in the magnetic field of the magnets on the high speed side 22. Reducing variation in magnetic field on the high speed side will result in small losses there in comparison to the losses and heat generation occurring in the smaller magnets on the low speed side 24 of the coupling 20.

By diverting heat generation away from the components inside the high speed, low pressure chamber, and instead directing heat generation to the air side of the magnetic coupling 20, the need for cooling the low pressure or vacuum chamber within which the flywheel operates is removed or at least reduced. By simplifying the cooling requirements in this manner, the overall design of the flywheel and coupling 20 is simplified and therefore made more efficient, cost effective and user friendly.

Instead of or as well as using relatively large magnets on the high speed side 22 of the magnetic coupling 20, particular magnet types can be selected for each side of the coupling. According to an embodiment, high strength sintered magnets are used in the high speed rotational section 22 and low strength bonded magnets are used in the low speed rotational section 24.

It is known that bonded magnets have several advantages in magnetic coupling arrangements. For example they enable the magnetic gear in which they are comprised to move faster and they also reduce eddy current losses. However they are lower strength than sintered magnets. Therefore, according to an embodiment, a selection has been made so that high strength sintered magnets are used on the high speed side of the magnetic coupling 20 and lower strength bonded magnets are used on the low speed side. The variation in strength between the sintered and bonded magnets skews the magnetic field of the magnetic coupling 20 so that the strength of the magnetic field across the high speed side of the coupling varies only a little. Therefore heating inside the vacuum or low pressure space is reduced and instead almost all of the heating happens, and therefore almost all of the losses are incurred, on the air side of the magnetic coupling, away from the rotating flywheel. However such losses are at least partially accounted for and reduced by the use of bonded magnets on the low speed, air side of the coupling since bonded magnets have the effect, inter alia, of reducing eddy current losses.

Figure 3:
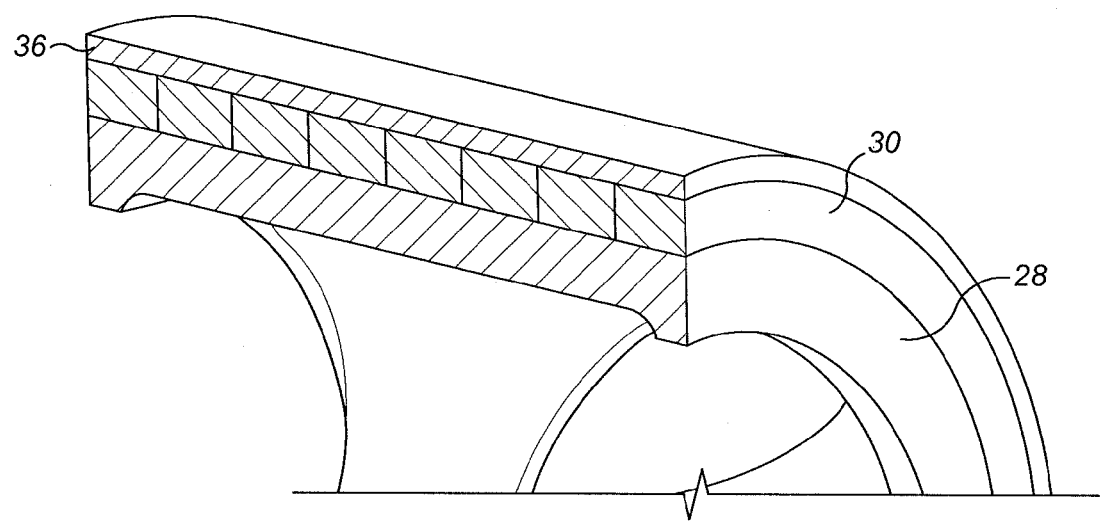
FIG. 3 is an axial cross-section view through the high speed side of the coupling shown in FIGS. 2a and 2b.

Looking at FIG. 3, the high speed side 22 of an improved coupling apparatus can be seen in more detail. As shown therein, a retainer 36 is provided radially inward of and adjacent to the high speed magnetic array 30, so that the array 30 is sandwiched between the retainer 36 and the high speed hub 28. The retainer 36 is provided around the outside edge of the magnets and thereby acts to retain the magnets in place.

The retainer 36 can take the form of, for example, an overwind or outer sleeve. It can comprise any suitable retaining material wound or otherwise fixed around the outside edge of the magnets on the high speed hub 28 in order to retain the magnets in place and stop them from being forced radially outwards from the centre of the high speed hub 28 by centripetal forces resulting from the rotation of the hub 28.

One suitable retaining material for the retainer 36 is Zylon, also known as polybenzoxazole (PBO). It is useful for this purpose as it is very high strength, has excellent thermal stability and is non conductive. However it is also possible to use other materials with similar properties, for example carbon, kevlar or glass. Whichever such retaining material is selected, it is held together with a suitable adhesive or resin. Using carbon as the retaining material in the overwind or outer sleeve has the potential advantage that it may create a more uniform mixture of retaining material and resin.

According to an embodiment, the retainer 36 is an outer sleeve comprising an interference fit sleeve of a suitable material such as carbon or Zylon (PBO), which is fitted over the magnets on the high speed hub 28. By using a push-on or interference fit sleeve of this type, it is possible to assemble the magnetic coupling 20 using preformed components, since the entire high speed section as shown in FIG. 3 is self contained and stable. An interference fit also avoids the risk of the retainer around the magnets unravelling when the high speed hub 28 is rotated, as can happen in prior art overwind arrangements.

Figure 4A:
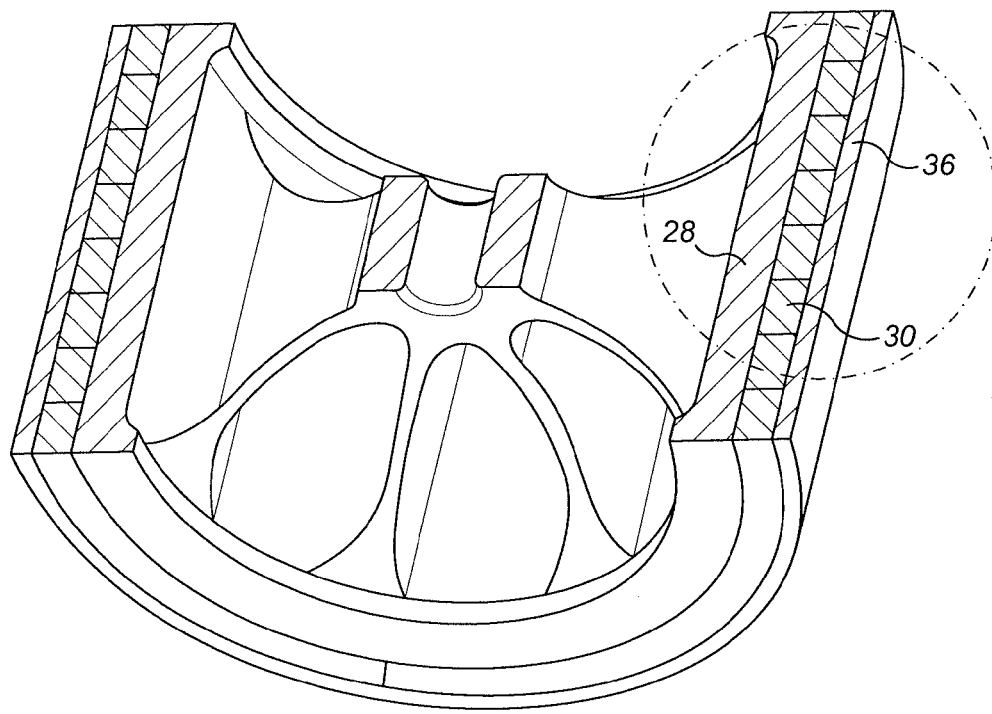
FIG. 4a is another cross-sectional view of the high speed side of the coupling shown in FIG. 3.
Figure 4B:
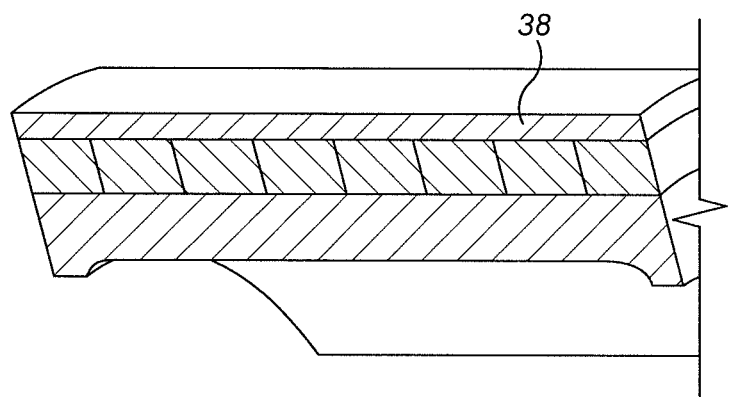

FIGS. 4a and 4b provide more information on the overwind or outer sleeve in the high speed rotating section 22 of the magnetic coupling 20. According to an embodiment, the adhesive material holding together the retaining material which encases the high speed magnets comprises a thermoset plastic, preferably an electronically stress relieved epoxy resin. The epoxy may be impregnated with small fragments of other materials in order to improve its operation. For example, ZnO and/or $AL_2O_3$ may be impregnated in the epoxy resin. The addition of such materials relieves stress across the width of the retainer, hence improving the overall robustness of the magnetic coupling 20.

Using conductive materials for the small fragments embedded in the epoxy as shown in FIGS. 4a and 4b is advantageous since conduction through the epoxy via the embedded materials prevents the expansion and contraction of the epoxy resin and hence of the retainer 36 as a whole. This reduces fatigue of the high speed magnet array 30 and therefore of the magnetic coupling 20.

The use of an electronically stress relieved epoxy as an adhesive for the magnets in a high speed magnet array 30 of a magnetic coupling is unique and provides distinct advantages over prior art arrangements. The use of Zinc Oxide (ZnO) as an impregnated material in the epoxy is advantageous due to its ability to sustain large electric fields. The use of aluminium oxide or alumina ($Al_2O_3$) impregnated in the epoxy resin is also advantageous since it is a good electrical insulator and has high thermal conductivity. Therefore the combination of these two types of impregnated fragments serves to greatly enhance the operation of the epoxy by providing electronic stress relief. Other suitable embedded fragments may be used to provide similar electronic stress relief instead of or as well as ZnO and $Al_2O_3$.

Figure 5:
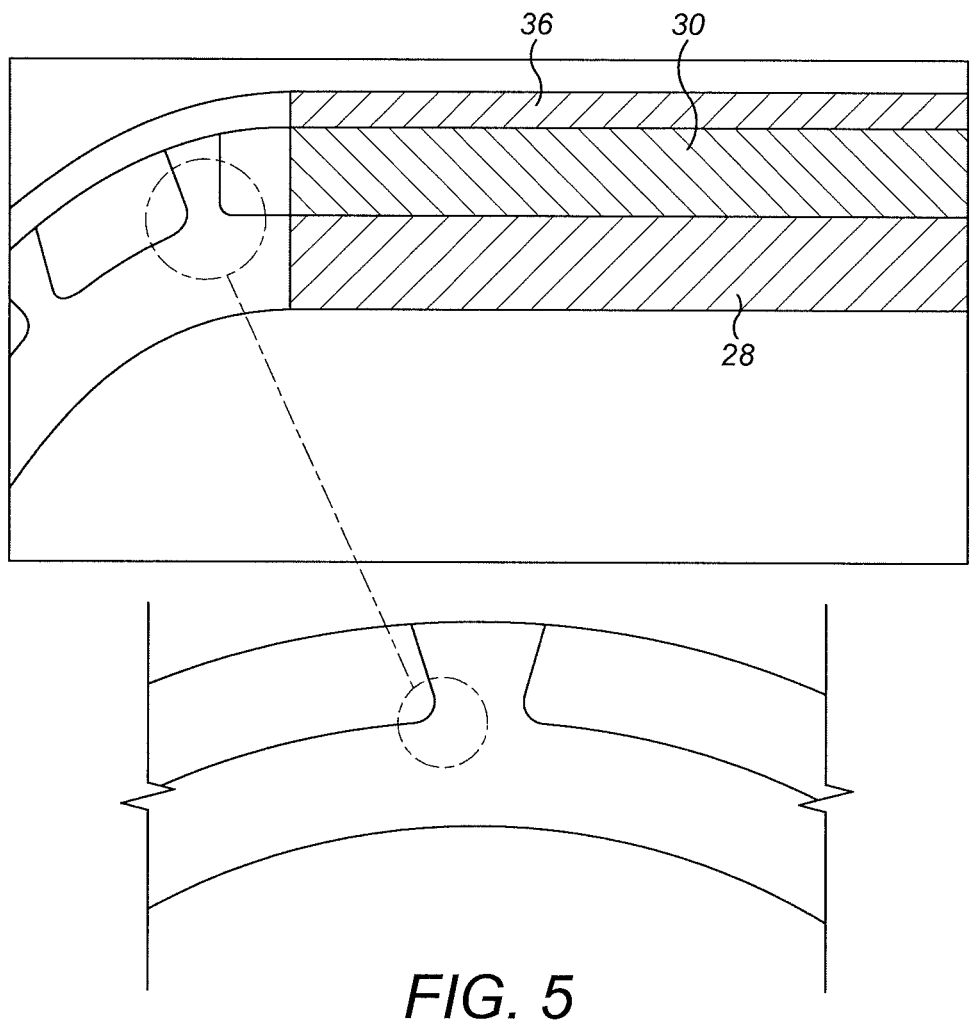
FIG. 5 shows an embodiment of the high speed side of the coupling shown in FIG. 3 including trapezoidal magnets.

In order to further improve operation of the magnetic coupling 20, a particular shape of magnet may be used on the high speed side of the coupling 20. In conventional magnetic coupling arrangements the magnets used are rectangular in cross section and there is no mechanical locking therebetween. In contrast, according to an embodiment of the present magnetic coupling 20, as shown in FIG. 5, the magnets used on the high speed side 22 are trapezoidal in cross-section. This shape enables the magnets to be slid into the structure shown in FIGS. 4a and 4b and to achieve mechanical locking therein. This can work in conjunction with the retainer 36 described above in order to make the high speed section 22 more robust and resistant to fatigue or failure during rotational operation.

Figure 6A:
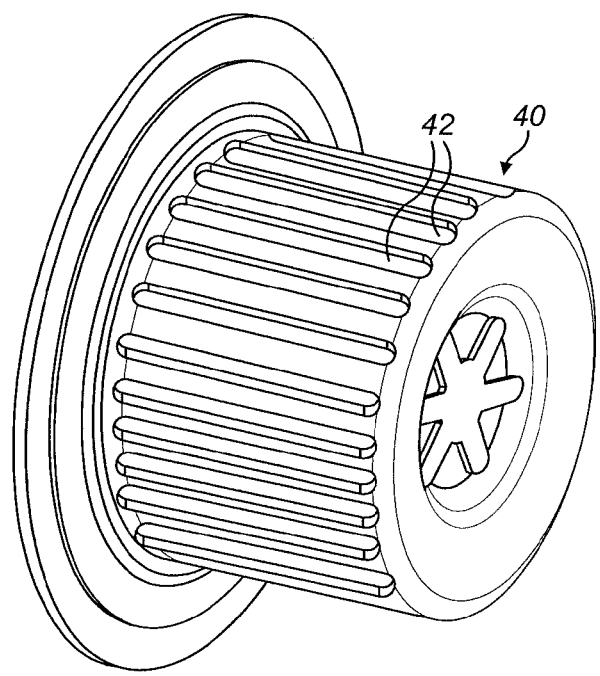
FIG. 6a shows a housing for a flywheel and the high speed side of the coupling shown in FIGS. 2a to 5.

FIG. 6a shows a housing 40 that can encase the high speed rotating section 22 of the magnetic coupling 20. Because this housing 40 encases a vacuum or low pressure area, and also because it forms a boundary between the high and low speed sides of the magnetic coupling 20, it should have certain physical properties in order for the coupling to operate effectively. The housing 40 should ideally be non-electrically conductive, mechanically strong and should have low permeability. In addition, it should have low porosity in order to act as an effective vacuum or low pressure area barrier. One possible material to be used is polyether ether ketone (PEEK). PEEK is a useful material for the housing 40 since its mechanical and chemical resistance properties are retained at high temperatures, it is non-conductive and it also has low permeability which is important for a low pressure casing. Alternatively glass could be used for the housing 40.

As can be seen in FIG. 6a, grooves 42 may be provided on a surface of the housing 40, wherein such grooves 42 are used to locate the stationary poles 26 between the high and low speed magnet arrays 30, 34. In the embodiment shown in FIGS. 6a and 6b, the grooves 42 extend parallel to the central rotational axis of the housing 40, being positioned parallel to one another around the outer surface or wall of the housing 40. The poles 26 as shown in FIG. 6b can be slotted into the grooves 42, and can be substantially rectangular in cross-section although other cross-section shapes are possible.

Restraining bands 44 may be used to keep the poles 26 in place in the grooves 42 on the housing 40. In the embodiment shown in FIG. 6b, three restraining bands 44 are wrapped around the outer circumference of the housing 40 in order to keep the poles 26 in place. However it will be appreciated that any suitable number and arrangement of restraining bands 44 may be used. The material selected for the restraining bands should, like the housing 40, be non-conductive and mechanically strong. For example glass fibre bands may be used.

Figure 6B:
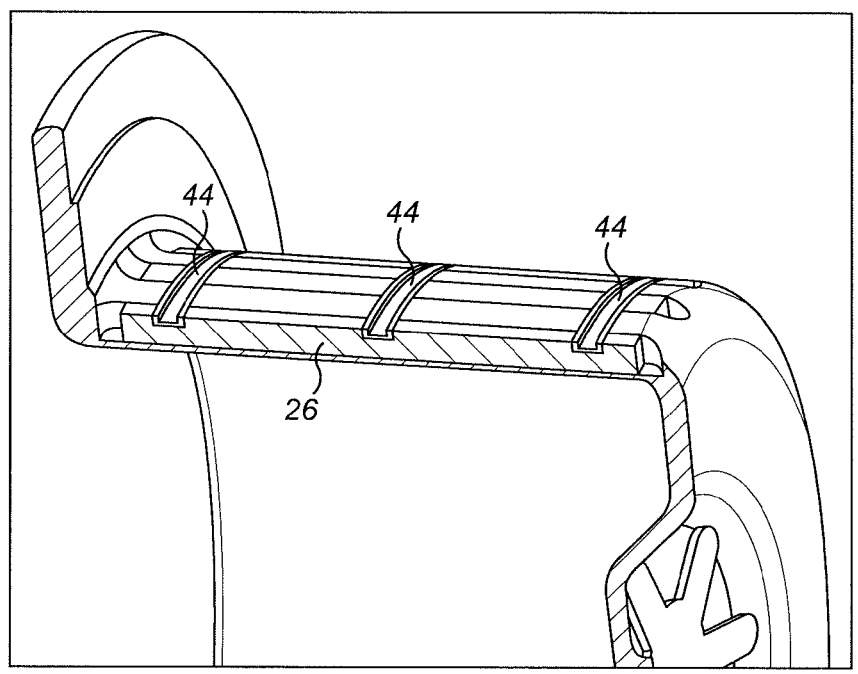
FIG. 6b shows a section of the housing shown in FIG. 6a with poles and restraining bands included.

By using a slotted housing 40 and cooperating poles 26 as shown in FIGS. 6a and 6b, simplified manufacturing and assembly processes can be achieved for the stationary portion of the magnetic coupling 20. The arrangement shown also comprises reduced areas of stress as compared to prior art pole arrangements.

Figure 7A:
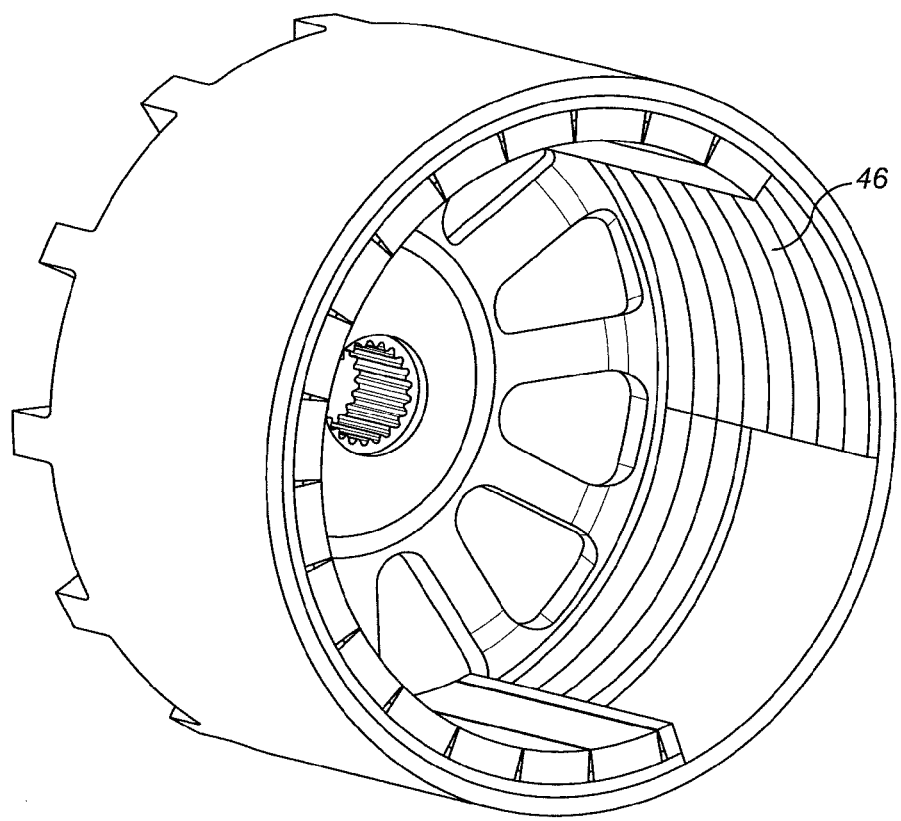
FIG. 7a shows the low speed side of an improved magnetic coupling.
Figure 7B:
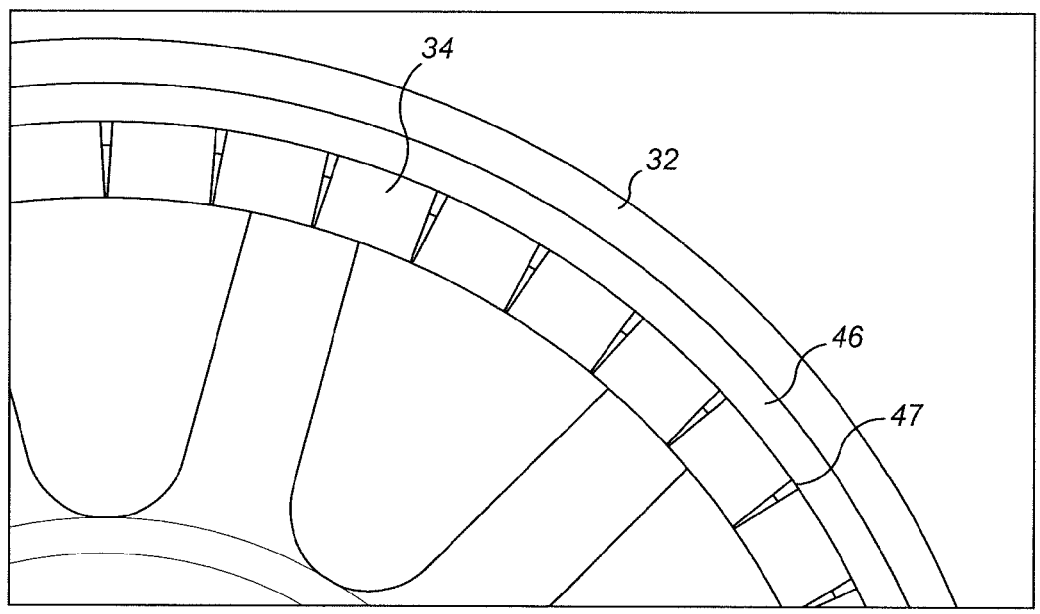

FIGS. 7a and 7b show an embodiment of the outer, low speed section 24 of an improved coupling apparatus in more detail. As shown therein, a liner 46 is provided between the low speed magnets 34 and the low speed hub 32. The liner 46 should have certain physical properties including low electrical conductivity. According to one embodiment, the material chosen for the liner is somaloy which is a ceramic that has very high permeability and low conductivity. The use of a somaloy liner or another suitable liner, for example a liner made of another type of ceramic, is useful since it reduces eddy current losses in the low speed section 24 of the magnetic coupling 20.

As can be seen in FIG. 7a, the liner 46 should preferably not extend around the entire inner circumference of the low speed hub 32. Instead it should be broken up into sections along the length of the hub in order to further reduce eddy current losses.

As can be seen more clearly from FIG. 7b, the alignment of the liner 46 with the low speed magnets 34 is of particular importance and is unique to the improved magnetic coupling 20 described herein. That is, as shown in FIG. 7b, the low speed magnets 34 are arranged so that they each extend axially, parallel to the central rotational axis of the low speed hub 32. Conversely, the somaloy is wrapped in sections along the inner circumference of the low speed hub 32, having a thickness that extends radially inwards. In embodiments where the somaloy or other type of liner 46 is provided in sections, it is important that discontinuities or section ends 47 of the liner 46 align with gaps between respective low speed magnets 34. By aligning the discontinuities in the liner 46 with the edges of the magnets 34, stress in the liner 46 is reduced and therefore mechanical stability is enhanced. If this alignment was not provided, for example if the section end 47 of a somaloy liner 46 was located just under the centre of a low speed magnet 34, eddy currents would build up between the liner 46 and the magnet 34 and, furthermore, the pressure of the magnet would create physical stress on the liner which could cause it to break. Therefore the alignment as shown in FIGS. 7a and 7b reduces eddy current losses, reduces magnet stress and reduce physical stresses on the liner 46.

Figure 8:
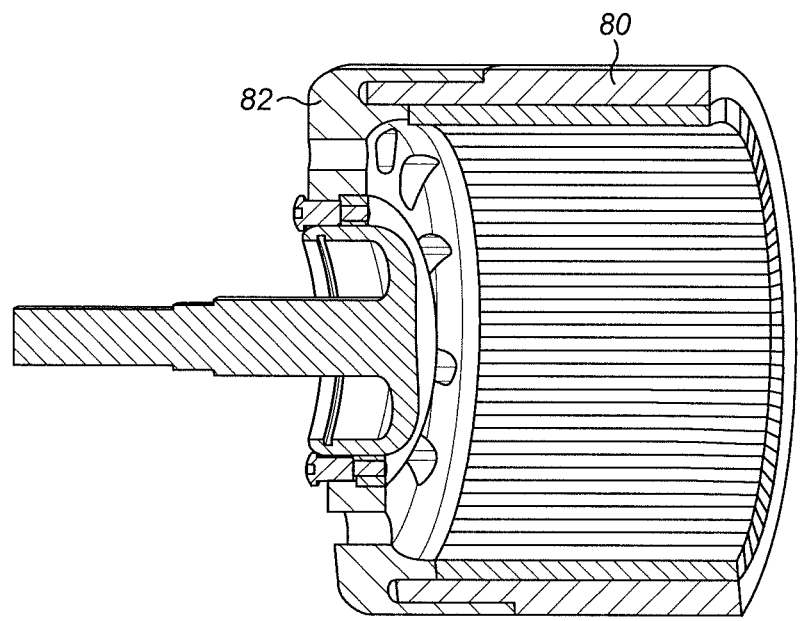
FIG. 8 shows a side cross section through the low speed section of an improved magnetic coupling.

FIG. 8 shows an embodiment of the outer, low speed section 24 of an improved coupling apparatus. The low speed section 24 includes an outer rotor or hub 32 and an array of low speed magnets 34 provided radially inwards of the hub 32.

Preferably the low speed hub 32 is manufactured from a material with a low conductivity (less than 100 S/m) and low permeability. For example it can be made from PEEK or glass fibre. In the embodiment shown in FIG. 8 the low speed hub 32 is comprised of two different materials. The first material 80 is provided adjacent to the layer of low speed magnets 34. In the embodiment shown, the first material 80 comprises a tube element which provides radial location and containment of the low speed magnets 34. It is designed to have hoop strength and support the magnets 34 along their length, and so it should have some bending stiffness. The first material 80 can therefore comprise roll-wrapped Glass fibre with a combination of hoop and helical layers (or plies).

In FIG. 8 the second material 82 is provided radially outward of a portion of the first material 80, generally away from the magnets 34. It connects the first material 80 to the bearings on the improved coupling apparatus. It can comprise glass-filled PEEK which can be moulded to the required shape.

The location and type of material or materials used for the low speed hub 32 can be selected to maximise useful physical properties of those materials in certain locations. For example, an alternative construction of the low speed hub 32 comprises a single composite part which fulfils both roles of the first 80 and second 82 materials described above.

In general, using a material of low conductivity for the low speed hub 32 reduces any current losses from the improved coupling apparatus. As will be known to the skilled person, any current losses generate a notable amount of heat as the rotational speed of the low speed hub increases. Therefore reducing these losses is of importance to efficiency of the apparatus. In addition, using a material with low permeability for the low speed hub 32 reduces the hysteresis losses. Hysteresis losses are more dominant at lower rotational speeds and increase linearly with speed. Again therefore it is of importance to the overall efficiency of the apparatus to reduce them.

Both eddy current losses and hysteresis losses result in unwanted heat generation which would limit the speed capability and the life-time of the improved coupling apparatus. Therefore by selecting appropriate materials for the low speed hub 32, the improved coupling apparatus can have enhanced speed capability and a longer life span.

The improved coupling apparatus as described herein will normally be provided and used within an outer housing or casing. Usually that casing is stationary and does not rotate with the high speed or low speed sections of the improved coupling apparatus.

According to a further improvement provided herein, the outer casing of the improved coupling apparatus can provide flux shielding. This can be better understood with respect to FIGS. 9A and 9B. As described above, using a material which has low permeability for the outer rotor or low speed hub 32 of the improved coupling apparatus can have several advantages. However, such a low permeability material will only be able to mildly constrain the magnetic field produced in the improved coupling apparatus. If that magnetic field is allowed to span out by the outer rotor or hub 32, it will influence other components of the improved coupling apparatus. This will result in heat generation for example in the apparatus casing. It may also result in magnetic interference risks to components external to the improved coupling apparatus. This is undesirable when the apparatus is to be housed in an area where its surroundings are sensitive, for example if electronic control devices or sensors are located in the vicinity of the area of the improved coupling apparatus, as will often be the case in practice.

Figure 9A:
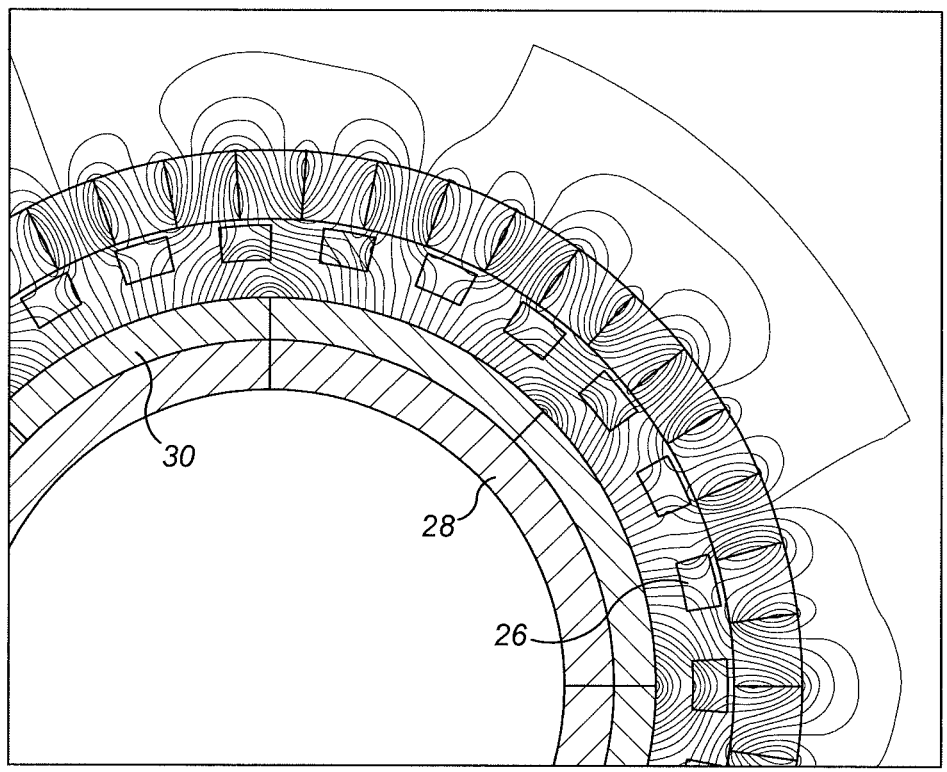
FIG. 9a shows a cross section through part of an improved magnetic coupling, without shielding exterior to the low speed section.
Figure 9B:
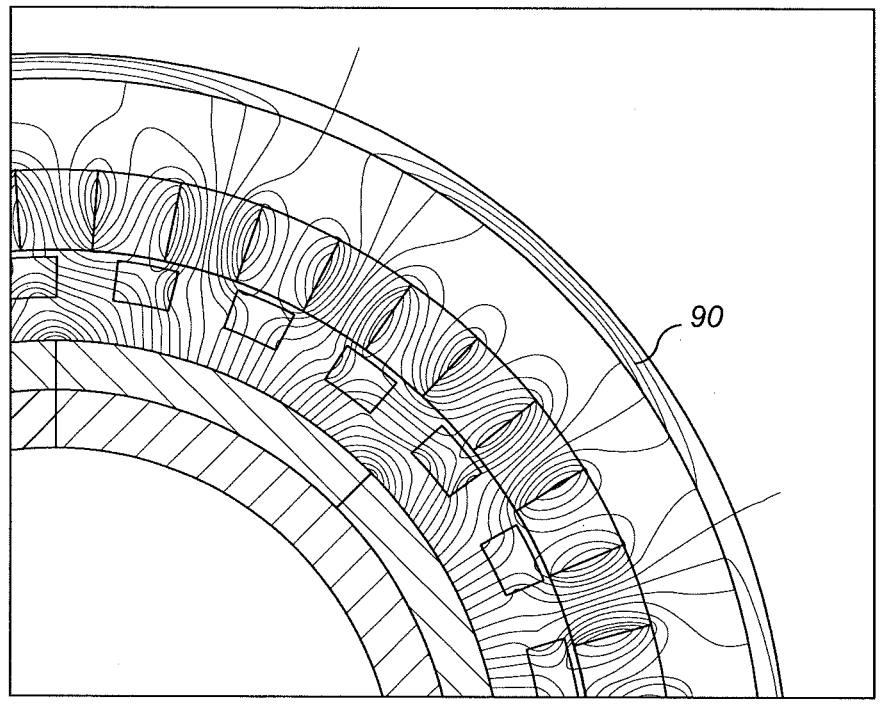
FIG. 9b shows a magnified view of part of the improved magnetic coupling of FIG. 9a, but with shielding provided outward of the low speed section.

FIG. 9a shows an improved coupling apparatus modelled with no flux containment outward of the low speed magnets 34. It shows the flux penetrating outside the magnets 34 into the region that would comprise the low speed hub 32 and/or the apparatus casing. FIG. 9b shows the apparatus with an additional flux ring which holds the flux and prevents it penetrating outside of this diameter, thus protecting any parts in this region from the magnetic field and protecting the system from any losses such as inefficiency and heating, which arise from this interaction.

As described above, if a low permeability material is used for the low speed hub 32, it will have little influence on the magnetic field external to the magnets 34. To compensate for this in the embodiment illustrated in FIG. 9b herein, flux shielding is implemented on an internal surface of the apparatus casing 90. This flux shielding acts to control the magnetic field produced in the apparatus, reducing the heating effect and interference risks that such a field can pose.

Any suitable flux shielding may be provided on the internal surface of the apparatus casing 90. By way of example, the flux shielding may be provided by electrical steels. Electrical steels are specialist steels which are manufactured to optimise their electrical and magnetic performance in magnetic circuits. In the apparatus shown in FIG. 9b, the material inward of the casing 90 needs to contain the magnetic field so requires high permeability combined with high electrical resistivity. The material should also be designed minimise hysteresis losses.

Segments of thin laminated electrical steels may be provided over part or all of the inner surface of the casing. Alternatively insulated electrical steel wire may be hoop-wound wind to form a tube. That tube can be provided surrounded by the outer casing of the apparatus. Alternatively, a region or regions of soft magnetic composite such as Somaloy may be provided on an internal surface of the casing 90 to provide flux shielding.

Providing the flux shielding on an internal surface of the apparatus casing has several associated advantages. Because the casing is stationary and will not rotate during use of the improved coupling apparatus, the attachment requirements between the casing and the flux shielding material are simplified as compared to an embodiment in which such shielding is provided within rotating parts of the improved coupling apparatus. Also, during operation of the apparatus, the casing is stationary and the outer rotor (or low speed hub) is rotating in the opposite direction to the inner rotor (or high speed hub). Therefore a single point on the outer rotor sees the inner rotor moving at a higher relative speed than it sees a static point on the casing moving at. Therefore the speed difference between the shielding on that casing and the inner rotary magnets of the high speed section is reduced, as compared to the speed difference between the high speed magnets and the low speed magnets in the improved coupling apparatus. Therefore a shield on the casing 90 will see lower field modulation frequencies than a shield on the outer rotor would.

A reduction in relative speed between the shielding and the inner rotor leads to a reduction in losses through a reduction in the frequency of excitation of the magnetic field in a return path components. That is, the losses from induced eddy currents and hysteresis are a function of the frequency of field change. The higher this frequency is, the higher the losses will be. Therefore providing the shield on the casing instead of the outer rotor reduces the frequency so it reduces the associated loss.

Because the casing 90 does not comprise any magnetic materials, it can have a higher temperature capacity than the magnetic part of the improved coupling apparatus. Therefore providing magnetic flux shielding on an internal surface of the casing is less likely to cause damage than if the shielding was provided in either of the high speed section or low speed section of the improved coupling apparatus. The casing 90 can also have a larger thermal inertia for sinking into than the magnetic and/or moving parts of the improved coupling apparatus can have. Therefore providing magnetic flux shielding on an inner surface of the casing is again less likely to cause damage than locating such shielding elsewhere may do.

Figure 10:
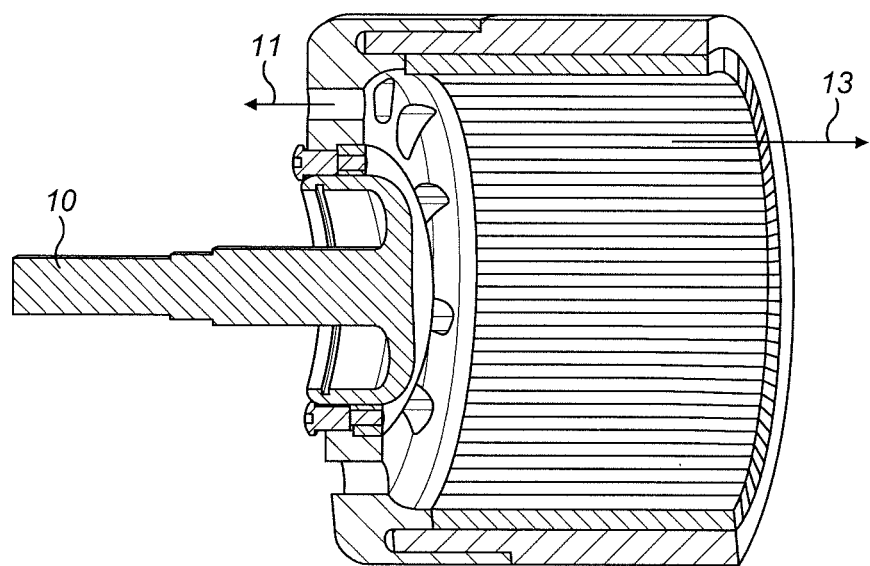
FIG. 10 shows the shaft side and end plate side improved magnetic coupling of FIG. 8 including a shaft.

As described above, the improved coupling apparatus can be used to transfer energy stored within a rotating flywheel to one or more external components, within a system. In order to transfer the energy out of the improved coupling apparatus itself, the low speed hub 32 or so called "outer rotor" of the apparatus can connect to an axle or shaft 10 which provides a mechanical connection to other components in the system, as shown in FIG. 10 herein. The outer rotor of the improved coupling apparatus needs to be supported on bearings and to provide a mechanical drive into the rest of the system (not shown). This shaft 10 is provided for this purpose. The shaft 10 extends from one end (the shaft end 11) of the apparatus and is substantially co-axial with the axis of rotation of the high speed and low speed sections of the improved coupling apparatus.

On the other side 13 of the apparatus, axially opposite the shaft 10, an end plate may be provided. The end plate can be part of the flywheel casing. It can support and contains the flywheel and all magnetic parts of the improved coupling apparatus and also hold the vacuum. The end plate can also shield and protect the surrounding casing parts from the magnetic fields and the associated losses, since those parts are usually made from steel or Aluminium.

There is potential for magnetic field losses at the end plate side 13 is of the apparatus which can result in undesirable heating of the end plate and in drag torque, which will reduce the efficiency of the improved coupling apparatus. According to an improvement provided herein, magnetic field losses at the end plate side 13 can be reduced or even overcome by the use of shielding on the end plate to deflect the magnetic field away therefrom. Such shielding can be provided on an internal surface of the end plate, over part or all of its surface, and should be comprised of a low conductivity, high permeability material. For example a layer or sections of Somaloy may be used on the surface of the end plate to deflect the magnetic field.

Figure 11A:
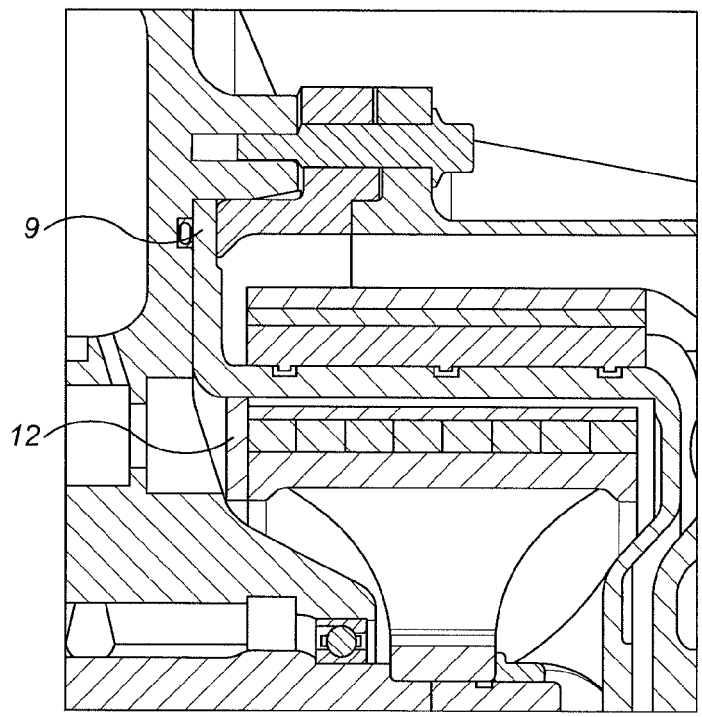
FIG. 11a shows a cross section from above of one side of an improved magnetic coupling with an end cap on the high speed section.
Figure 11B:
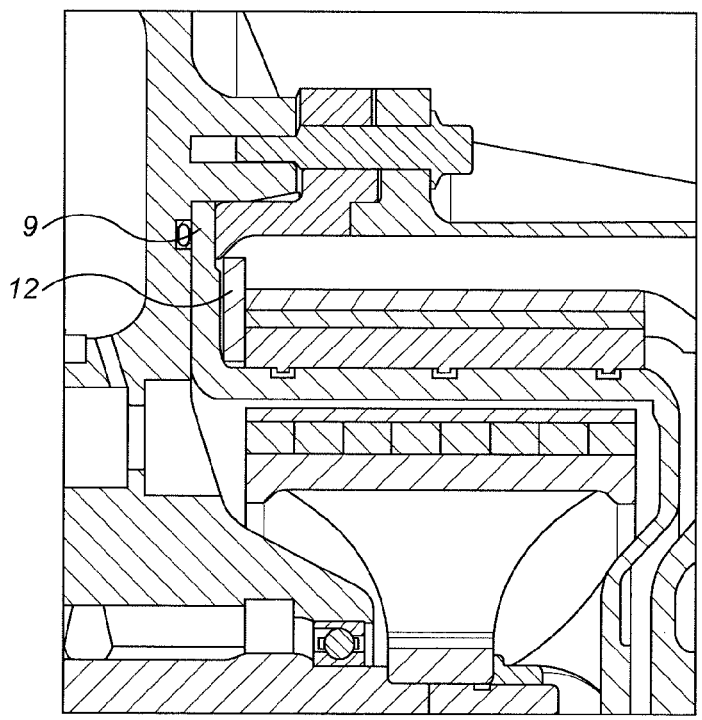
FIG. 11b shows a cross section from above of one side of an improved magnetic coupling with an end cap on the low speed section.

Another way to reduce or eliminate magnetic field losses at the end plate side of the apparatus is to use an end cap 12 as shown in FIGS. 11a and 11b herein. The end cap 12 comprises a ferrous element positioned axially between the magnets on the improved coupling apparatus and the casing. This acts to short circuit the end of the magnets, reducing the amount of stray field which penetrates the casing. The end cap 12 can for example be an extension of a rotor or it may be a separate component. Alternatively a disc or series of segments of soft magnetic material can be attached to the end of the hub to provide this short circuit.

FIG. 11a shows a cross sectional view from above of one side of an improved coupling apparatus. There is a chamber wall 9 provided between the high speed section (shown below the chamber wall 9 in FIG. 11a) and the low speed section (shown above the chamber wall 9 in FIG. 11a) of the apparatus. The chamber wall 9 houses the high speed section of the apparatus and can also house a flywheel (not shown) within a vacuum or low pressure area as described in more detail above. It can also extend along the end plate side of the outer, low speed section of the improved coupling apparatus but does not enclose the low speed section. As show in FIG. 11a, the end cap 12 may be provided on an end of the high speed section of the improved coupling apparatus. Alternatively, as shown in FIG. 11b, it can be provided on an end of the low speed section. The problem of field containment exists on both rotors (low speed and high speed) but is more significant on the faster rotor as it has much higher frequencies and stronger magnets as discussed above. The end cap 12 may comprise shielding material as described above with respect to the end plate.

Figure 11C:
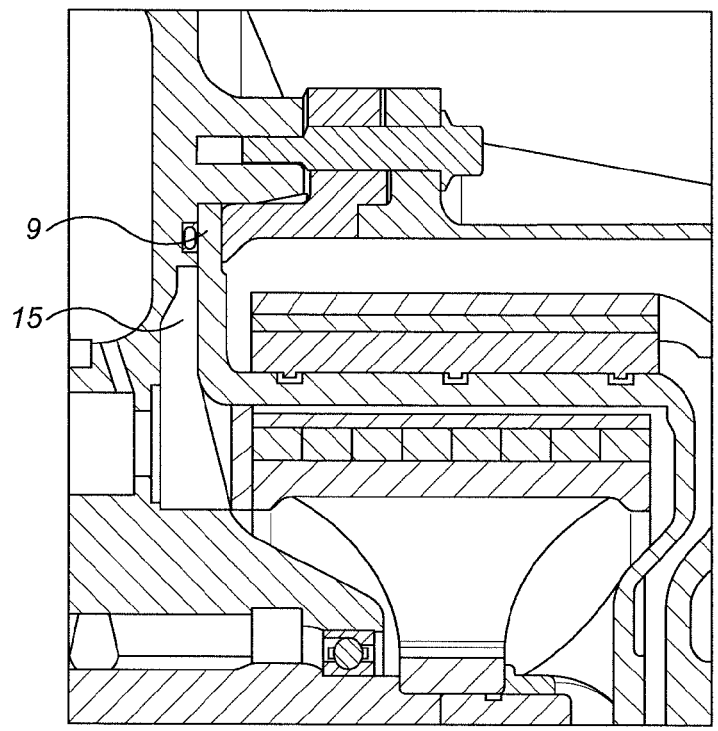
FIG. 11c shows a cross section from above of one side of an improved magnetic coupling with an air gap between the rotating parts and the end plate.

The end plate or end cap does not have to be provided directly adjacent the rotating parts of the improved coupling apparatus. Instead, as shown in FIG. 11c herein, an end plate 15 can be provided separated from the ends of the rotating parts of the improved coupling apparatus by a gap such as an air gap. Increasing the size of the air gap would decrease the field strength at such an end plate 15. Therefore the risk of magnetic field effects at the end plate 15 reduced.

Shielding of the magnetic field generated within the improved coupling apparatus, to protect surrounding parts of a system, can be provided by any suitable combination of air gaps and/or shielding material on the outer rotor and/or on the outer casing, including on an end plate or an end cap. The shielding on the outer casing can be in the form of thin laminations made from electrical steels, which can be segmented to reduce current paths, or a soft magnetic composite such as Somaloy. In addition or alternatively, thin laminations or ferrous material can be provided on the hubs to contain the magnetic field and prevent it from straying into the outer apparatus casing.

Additionally or alternatively, the magnetic field in the low speed hub 32 can be contained through effective shaping of the magnets in the improved coupling apparatus. That is, it is possible to change the shape or path of the magnetic circuit by changing the end profile of the magnets close to the outer apparatus casing. This can involve shortening the axial length of the low speed magnets 34, so that they end before the hub 32 (i.e. they are not axially aligned) allowing the field to short circuit back to the hub 32. This would reduce the amount of axial stray field, thus avoiding having high frequency stray fields in the outer casing. The magnets can also be shaped to reduce stray axial field, which would otherwise cause losses in the outer casing material.

As will be appreciated from the description hereabove, it is important for the improved coupling apparatus to operate as efficiently as possible over a prolonged period of time. One factor that is very important to prolonged operation of the apparatus is removing heat including low level heat. It is important to maintain temperatures of the apparatus to prevent damage to their component materials and to any adhesive used to bond parts of the apparatus together. In operation, the low speed hub 32 will move over the lower speed magnets 34 and over the stationary pole pieces 26. This rotation naturally moves air over those parts of the apparatus. However, according to an improvement provided herein, additional methods of cooling are provided to encourage cool air to be drawn in to the apparatus to replace warm air. This ensures continuous heat transfer from the apparatus to the air, and thus removes heat from the apparatus on an ongoing basis.

According to an embodiment, enhanced air flow is achieved by providing scrolling on the rotating or stationary parts of the improved coupling apparatus. For example a protruding or grooved shape such as a helix can be provided on either the rotating or the stationary parts of the improved coupling apparatus. Such scrolling provides channels through which air can be directed in order to cool the surrounding parts of the apparatus, by circulating air during rotation of the rotors.

Alternatively or additionally, the rotating hubs and/or the stationary part of the improved coupling apparatus can be provided with projections such as fins or blades thereon. The fins or blades act to push air through the apparatus.

Figure 12A:
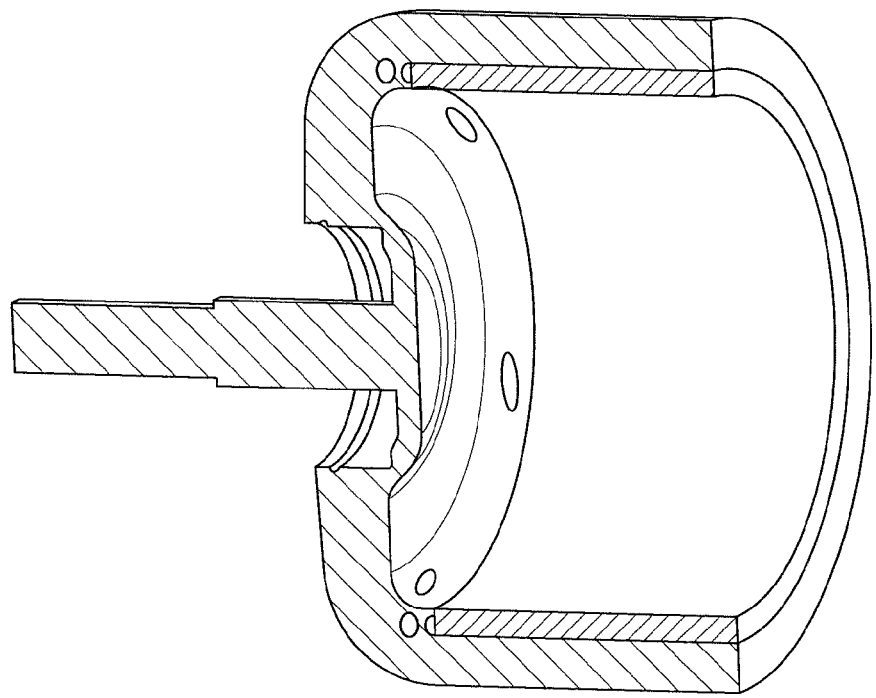
FIG. 12a shows an outer rotor for an improved magnetic coupling.
Figure 12B:
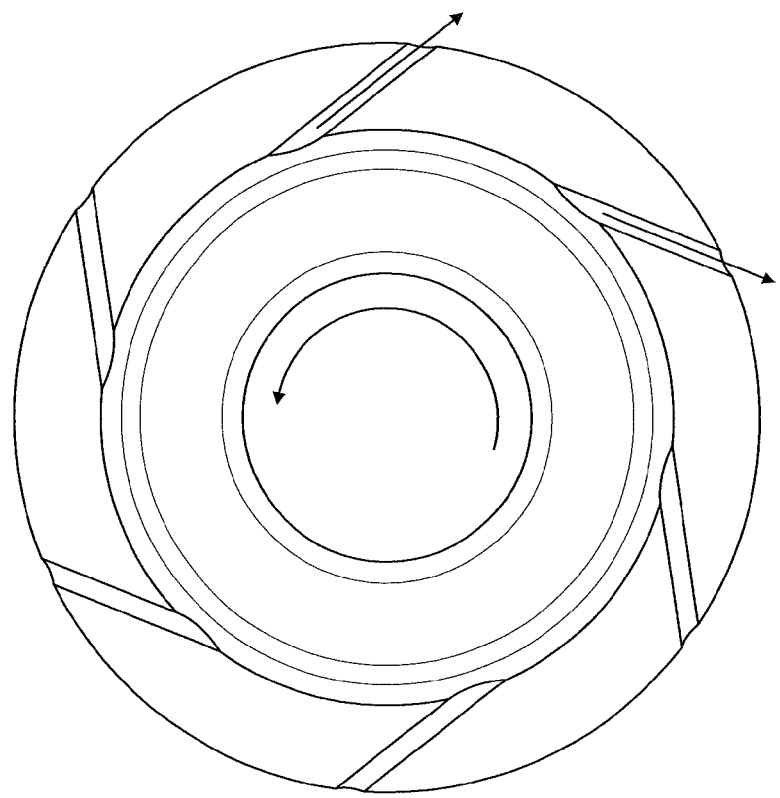

Additionally or alternatively, radially angled holes can be provided through one or more layers of the improved coupling apparatus in order to expel air therefrom, relying on the centripetal action of the rotating parts of the apparatus. This can be better understood with respect to FIGS. 12*a* and 12*b* herein. FIG. 12*a* shows the outer rotor or low speed hub 32 of the apparatus in side cross-sectional view whereas FIG. 12*b* shows the shaft end of the hub in plan view, from the inside of the apparatus. As shown in FIG. 12*b*, a plurality of holes or channels 16 is provided through the hub 32. Each channel 16 is provided at an angle to the radius of the improved coupling apparatus. The angle and location of the channels 16 can be selected so that air will be forced through them during rotation of the apparatus. When, as is shown in FIG. 12*b*, the rotating part of the apparatus rotates in an anticlockwise direction, the angular position of the channels 16 should be chosen so as they can create a substantially clockwise flow of expelled air from the apparatus. This air expulsion creates a flow which will pull air through and over part of the apparatus such as the electromagnetic poles 26 which are prone to heating.

Figure 13A:
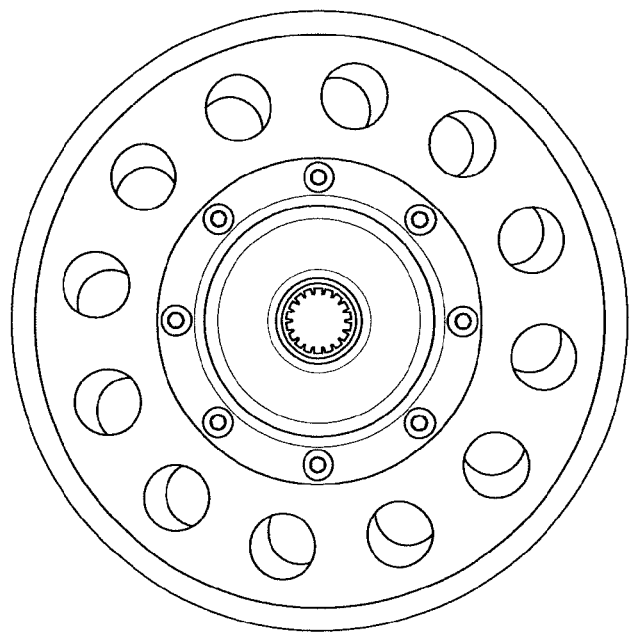
FIG. 13a shows the shaft end of an outer rotor of an improved magnetic coupling with actually angled holes therein.
Figure 13B:
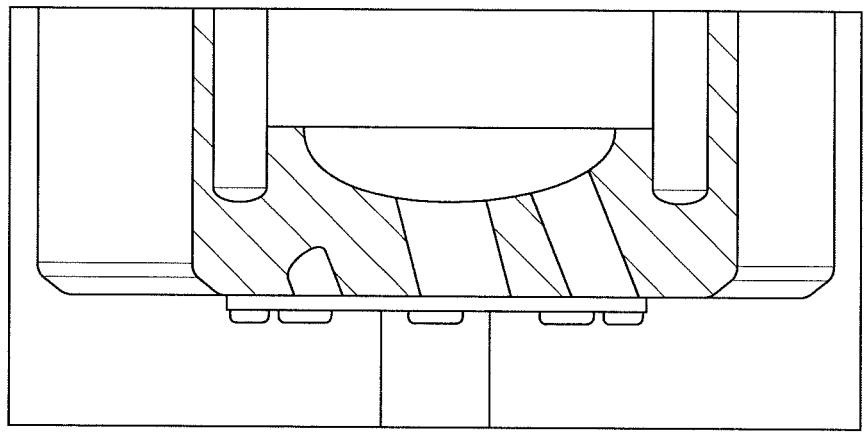
FIG. 13b shows a cross section from above the shaft end of the outer rotor shown in FIG. 13a FIG. 13c shows a side cross sectional view of the outer rotor shown in FIGS. 13a and 13b.
Figure 13C:
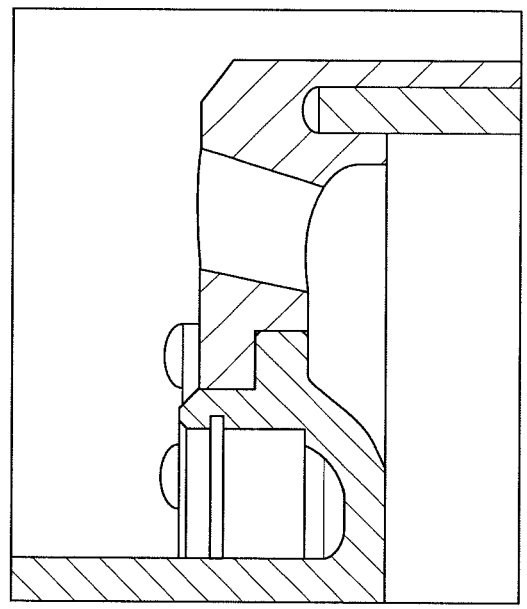

As well as or instead of providing radially angled holes, axially angled holes can be provided in the shaft end of the low speed hub 32, again to expel air through harnessing the effect of centripetal motion of the high and low speed sections of the apparatus. FIGS. 13*a* to 13*c* show an embodiment including axially angled holes in the shaft end of the low speed hub 32. As shown therein, a plurality of holes 18 can be provided for example in a circular pattern towards the outer edge of the hub 32. The holes 18 each have a length in the axial direction, and therefore define channels. As shown in FIGS. 13*b* and 13*c*, preferably those channels should extend at an angle to the axis of rotation and shaft of the apparatus.

Holes may also be provided around the outer, low speed hub 32 and/or the outer casing of the apparatus. Such holes allow airflow by making use of pressure differentials which are set up through the rotating motion of the improved coupling apparatus.

Figure 14:
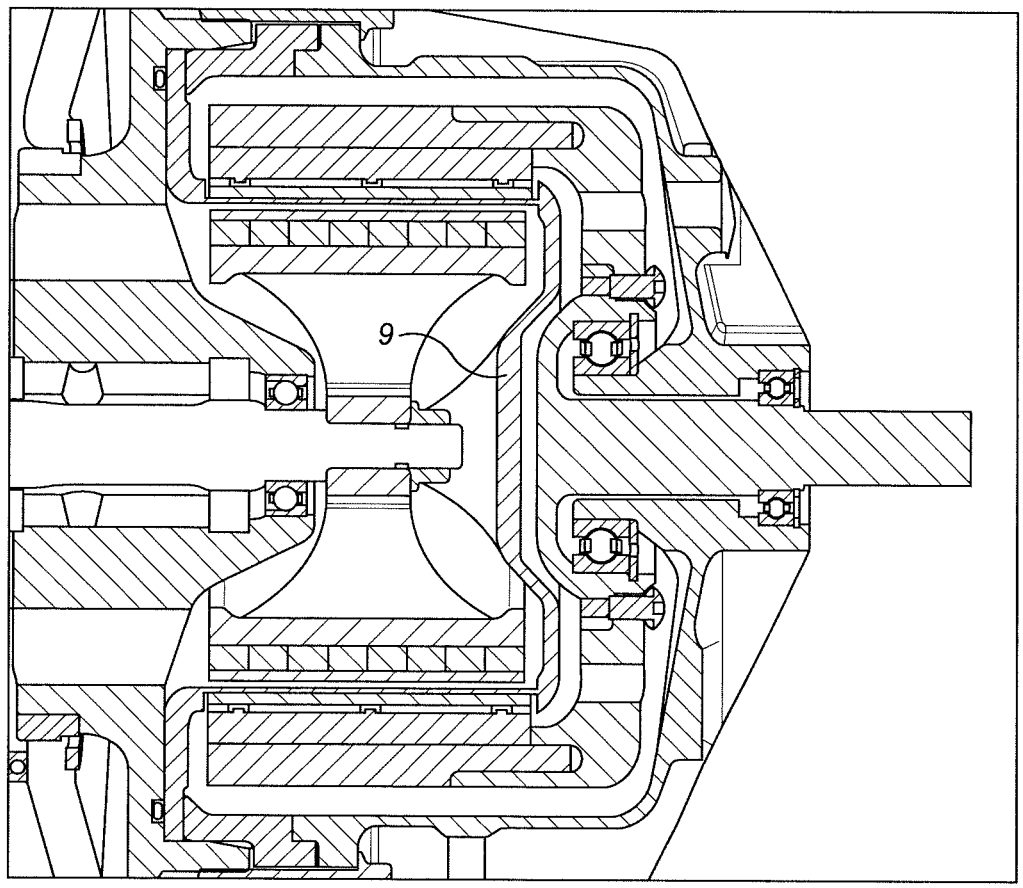
FIG. 14 is a cross section from above of an improved coupling apparatus being splash cooled and a cross sectional front view through the stator and outer rotor of the apparatus during the splash cooling.
Figure 14:
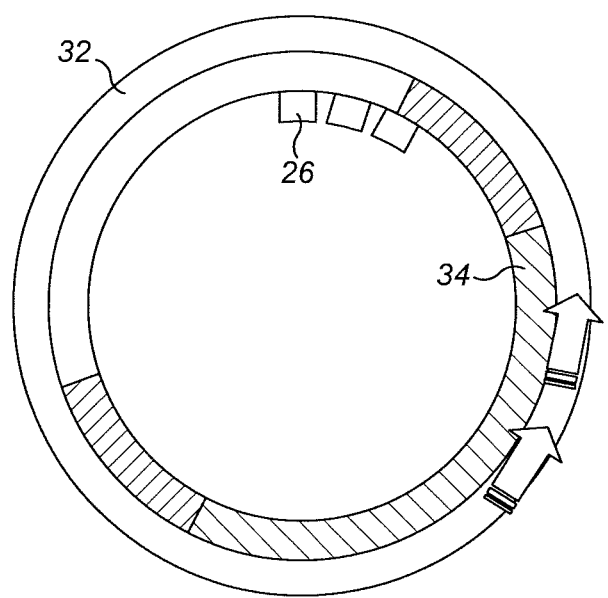

Additionally or alternatively, cooling fluids can be provided within the outer apparatus casing—on the air side of the improved coupling apparatus, not in the chamber which houses the fly wheel and high speed section of the apparatus in a vacuum—to splash-cool critical components such as the outer rotor magnets and stator pins (pole cage). FIG. 14 shows an example of the parts of an improved cooling apparatus over which cooling fluid can be distributed. The splash-cooling fluid can cool passively via contact with and conduction of heat from the outer apparatus casing. In addition or alternatively, the cooling fluid can be circulated via an external circuit through that outer apparatus casing allowing heat to be removed actively therefrom. This can prove useful when the improved coupling apparatus needs to be operated at high speed for extended periods, and thus will generate excess heat.

As mentioned above, the embodiments and aspects described herein can be used in order to transfer energy into and out of a rotating flywheel. It is preferable, although not essential, for a flywheel to operate in a vacuum or low pressure area in order to reduce energy loss therefrom. Therefore a key advantage of using a magnetic coupling such as the one described herein is that the high speed section of the magnetic coupling can be housed together with the flywheel in a low pressure or vacuum member chamber or housing whereas the low speed side of the coupling can be located in the "real world", at atmospheric or other pressure, and may be connected to or otherwise in communication with other physical components which receive energy from and/or transmit energy to the rotating flywheel.

In practice, the applications of flywheels are well known. For example they can be used for energy storage and transfer in automotives. However they are also widely used in other applications in order to utilise otherwise wasted energy, for example in lifting machines such as passenger and good lifts and cranes. In order to optimise operation of a flywheel, the energy should preferably be transformed as little as possible during its transfer. Hence a magnetic coupling which can rotate with a flywheel and thus maintain a rotational form of energy is very useful in practice. The particular embodiments and aspects as described herein further improve the characteristics of a magnetic coupling by enhancing its efficiency and energy consumption reducing properties.

According to the embodiments and aspects described herein, the use of rotating seals is completely eliminated, thereby eliminating the need for environmental management apparatus to maintain the vacuum inside the vacuum chamber 140. The vacuum inside the vacuum chamber can remain there indefinitely since the chamber is completely sealed, using no rotating seals which can leak. The removal of the associated environmental management equipment (for example a vacuum pump, lubrication pump, associated pipe work and systems, control systems/electronics) further reduces the flywheel storage system weight and size and increases the energy storage density. Furthermore, reliability of this simpler system is accordingly improved and cost is reduced. Thereby a highly efficient flywheel energy storage device is provided.

The removal of rotating seals also allows the flywheel to rotate at a faster speed than would otherwise be possible due to degradation rates of the seals (which become worse as rotation speed increases), further increasing the energy storage density. Parasitic losses due to shear in the seal lubrication fluid (which is a necessary feature of rotating seals) will also be reduced by removal of the seals.

The improved magnetic coupling described herein can be used in conjunction with any other suitable component. For example a clutch may be provided for activation and deactivation of the coupling. One possible magnetic gear clutch is described in the International Patent Application claiming priority from GB patent application number 0920142.7, in the name of Ricardo UK Limited. Also described therein is an alternative pole arrangement comprising a pole cage. Such an alternative pole arrangement might be used in conjunction with the high and low speed sections of the magnetic coupling as described herein.

Whilst the appended figures and their accompanying description generally show and describe embodiments having magnetic field generating elements comprising permanent magnets which, in use, generate a moving magnetic field pattern by virtue of the magnetic field pattern being fixed relative to each hub or movable member and by rotation of the movable member, with a stationary coupling element being provided between the two movable members, in other embodiments the permanent magnet arrays on the first and/or second member could each be substituted with other elements such as an array of electromagnetic poles. Each electromagnetic pole array could be energised in a predetermined manner so as to produce an electromagnetic field pattern substantially the same as that produced by an array of permanent magnets. Alternatively, the hub or other member could be fixed relative to the intermediate coupling element and the electromagnetic poles be energised in a sequence so as to produce an alternating magnetic field pattern which is movable by virtue of the sequencing of the electromagnetic poles, relative to the coupling element. In still other embodiments the moving magnetic field could be produced by a combination of moving the member(s) and sequencing the energisation of the electromagnetic poles.

Furthermore, although the Figures generally show rotating examples, with the first and second members concentric with each other, the first and second members could instead be provided alongside one another. An end-on alignment of first and second members is also possible. In such an end-on arrangement, the intermediate coupling element can either be curved, or can be split into parts which are staggered, and the coupling element and/or the poles of the first and second members can also be split. In such an arrangement, rather than being split along the axis of rotation, they would be split in a radial direction.

One or both of the first and second movable members could be unrolled so as to form a planar surface. Such an arrangement would resemble a rack and pinion, or a pair of tracks slidable over each other, with the coupling element being disposed therebetween. In such arrangements, the first and/or second members and/or the coupling elements would be staggered in a direction which is orthogonal to the direction of movement and parallel to a surface between the members.

Features of the described embodiments can be used in any combination and in applications other than flywheel applications, for example any magnetic gearing or coupling application. For example, the improved coupling apparatus can be used to utilise otherwise wasted energy in lifting machines such as cranes and passenger and goods lifts.

It will be seen that, as a result of the features described above, a stronger safer, lighter, more efficient and more effective coupling means is provided.

The invention claimed is:

1. A coupling apparatus for transferring energy to or from a flywheel, said coupling apparatus comprising first and second movable members, each having one or more magnets arranged thereon, wherein the first movable member is arranged to be coupled to a flywheel and wherein the magnetic strength of a first magnet arranged on the first movable member exceeds the magnetic strength of a second magnet arranged on the second movable member.

2. The coupling apparatus of claim 1 further comprising a magnetic flux coupler arranged between the first and second movable members.

3. The coupling apparatus of claim 1 further comprising a membrane arranged to enclose the first movable member.

4. The coupling apparatus of claim 3 wherein the membrane is arranged to enclose the first movable member in a vacuum or low pressure chamber.

5. The coupling apparatus of claim 3 further comprising one or more pole pieces that at least one of:
   are arranged on a surface of the membrane;
   are located by one or more grooves or recesses of the surface of the membrane;
   interlock with a surface of the membrane;
   are restrained in place by a restrainer.

6. The coupling apparatus of claim 3 wherein the membrane is formed from Polyether ether ketone (PEEK) or glass fibre.

7. The coupling apparatus of claim 1 wherein the first magnet arranged on the first movable member is at least one of sintered or bonded.

8. The coupling apparatus of claim 1 wherein the combined magnetic strength of the one or more magnets arranged on the first movable member exceeds the combined magnetic strength of the one or more magnets arranged on the second movable member.

9. The coupling apparatus of claim 1 further comprising a retainer for retaining the one or more magnets arranged on the first movable member.

10. The coupling apparatus of claim 9 wherein the retainer comprises:
    a winding around an outer surface of the one or magnets arranged on the first movable member; or
    a sleeve arranged to fit over an outer surface of the one or more magnets arranged on the first movable member; or
    a push-fit sleeve or an interference-fit sleeve arranged to fit over an outer surface of the one or more magnets arranged on the first movable member.

11. The coupling apparatus of claim 9 wherein the retainer is formed from a retaining material and an adhesive material.

12. The coupling apparatus of claim 11 wherein at least one of:
    the retaining material comprises any of Zylon, Kevlar, carbon or glass;
    the adhesive material comprises a thermoset plastic; and
    the adhesive material further comprises fragments of one or more embedded materials.

13. The coupling apparatus of claim 11 wherein the adhesive material further comprises fragments of one or more embedded materials and the one or more embedded materials include metal oxides.

14. The coupling apparatus of claim 1 wherein at least one of:
    the first magnet arranged on the first movable member interlocks with a surface of the first movable member and/or with a surface of a retainer arranged to fit over an outer surface of said first magnet; and
    at least one of the first magnet arranged on the first movable member and the second magnet arranged on the second moveable member is substantially trapezoidal in cross section.

15. The coupling apparatus of claim 1 wherein the first and second movable members are relatively rotatable about a common rotation axis, with the second movable member being provided radially outward of the first movable member, wherein the second movable member comprises Polyether ether ketone (PEEK) or glass fibre.

16. The coupling apparatus of claim 1 further comprising a housing surrounding said first and second movable members, wherein a formation is provided on an inner surface of a housing, said formation being arranged to provide magnetic flux shielding during operation of the coupling apparatus and wherein said formation may comprise any of: a plurality of laminated electrical steels; a plurality of segmented electrical steels; an insulated electrical steel wire; a soft magnetic composite; or Somaloy material.

17. The coupling apparatus of claim 1 wherein the first and second movable members are rotatable about a common rotation axis, with the second movable member being provided radially outward of the first movable member and connected to a shaft at a first end.

18. The coupling apparatus of claim 1 further comprising a stator, between the first and second movable members wherein an air flow enhancer is provided on the stator, and/or on at least one of the movable members, to enhance air flow around the apparatus.

19. The coupling apparatus of claim 18 wherein the air flow enhancer comprises at least one of:
   a scrolling or groove;
   at least one projection, fin or blade;
   an opening or channel through the stator and/or through the second movable member;
   a fluid for application to an outer part of the coupling apparatus;
   at least the second movable member; or
   a stationary part of the coupling apparatus.

20. An apparatus comprising:
   first movable means for coupling to flywheel means;
   first magnet means arranged on the first movable means;
   second movable means; and
   second magnet means arranged on the second movable means;
   wherein the magnetic strength of the first magnet means exceeds the magnetic strength of the second magnet means.

* * * * *